(12) United States Patent
Hosseini et al.

(10) Patent No.: US 11,284,415 B2
(45) Date of Patent: Mar. 22, 2022

(54) OUT-OF-ORDER SCHEDULING

(71) Applicant: QUALCOMM Incorporated, San Diego, CA (US)

(72) Inventors: Seyedkianoush Hosseini, San Diego, CA (US); Joseph Binamira Soriaga, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/534,188

(22) Filed: Aug. 7, 2019

(65) Prior Publication Data

US 2020/0053748 A1 Feb. 13, 2020

Related U.S. Application Data

(60) Provisional application No. 62/717,694, filed on Aug. 10, 2018, provisional application No. 62/717,758, filed on Aug. 10, 2018.

(51) Int. Cl.
*H04W 72/12* (2009.01)
*H04L 1/18* (2006.01)
*H04W 72/04* (2009.01)

(52) U.S. Cl.
CPC .......... *H04W 72/1242* (2013.01); *H04L 1/18* (2013.01); *H04W 72/042* (2013.01)

(58) Field of Classification Search
None
See application file for complete search history.

(56) References Cited

U.S. PATENT DOCUMENTS

| 2019/0254067 A1* | 8/2019 | Al-Imari | H04W 72/1268 |
| 2020/0077436 A1* | 3/2020 | Singh | H04W 74/006 |
| 2021/0084644 A1* | 3/2021 | Bae | H04L 5/0055 |

OTHER PUBLICATIONS

International Search Report and Written Opinion—PCT/US2019/045753—ISA/EPO—dated Oct. 15, 2019.

(Continued)

*Primary Examiner* — Kouroush Mohebbi
(74) *Attorney, Agent, or Firm* — Holland & Hart LLP

(57) ABSTRACT

Methods, systems, and devices for wireless communications are described. A user equipment (UE) may transmit or receive transmissions that are out of order in relation to received preceding downlink transmissions (or resource grants), where the transmissions may include different priorities or service types. For example, a UE may transmit feedback for received downlink data including different priorities or service types, where the feedback is sent in a different order than the order in which the data was received. Additionally or alternatively, the UE may send or receive transmissions for different priorities or service types in a different order than an order in which a respective grant was received for each transmission. In addition to transmissions including different priorities or service types being scheduled out-of-order, transmissions including the same priorities or service types may be scheduled based on the order in which preceding downlink transmissions (or resource grants) were received.

58 Claims, 14 Drawing Sheets

(56) References Cited

OTHER PUBLICATIONS

NTT Docomo et al., "Handling UL Multiplexing of Transmissions with different Reliability Requirements", 3GPP Draft; R1-1802496, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 26, 2018-Mar. 2, 2018, Feb. 17, 2018, XP051398003, Retrieved from the Internet: URL:http://www.3gpp.org/ftp/tsg%5Fran/WG1%5FRL1/TSGR1%5F92/Docs/ [retrieved on Feb. 17, 2018], 6 pages.

OPPO: "Discussion on Overlapped UL Transmissions with URLLC", 3GPP Draft; R1-1806837, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 20, 2018, XP051442037, Retrieved from the Internet: URL:http://www.3gpp.org/ftp/Meetings%5F3GPP%5fsync/ran1/Docs/ [retrieved on May 20, 2018], 4 pages.

QUALCOMM Incorporated: "Summary of DL/UL Scheduling and HARQ Management", 3GPP Draft; R1-1803470_summary_7.1.3.3.2_scheduling_HARQ_V10, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 26, 2018-Mar. 2, 2018, Mar. 5, 2018, XP051398767, Retrieved from the Internet: URL:http://www.3gpp.org/ftp/tsg%5Fran/WG1%5FRL1/TSGR1%5F92/Docs/ [retrieved on Mar. 5, 2018], 23 pages.

QUALCOMM Incorporated: "Summary of Remaining Issues for UCI Multiplexing on PUSCH", 3GPP Draft; R1-1805666 Summary of Remaining Issues for UCI Multiplexing on PUSCH—Version 5, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018 Apr. 19, 2018, XP051427793, Retrieved from the Internet: URL:http://www.3gpp.org/ftp/Meetings%5F3GPP%5fsync/ran1/Docs [retrieved on Apr. 19, 2018], 10 pages.

\* cited by examiner

OUT-OF-ORDER SCHEDULING

CROSS REFERENCE

The present Application for Patent claims the benefit of U.S. Provisional Patent Application No. 62/717,694 by Hosseini et al., entitled "OUT-OF-ORDER SCHEDULING," filed Aug. 10, 2018, and to U.S. Provisional Patent Application No. 62/717,758 by Hosseini et al., entitled "OUT-OF-ORDER SCHEDULING" filed Aug. 10, 2018, both of which are assigned to the assignee hereof, and expressly incorporated by reference in their entirety.

FIELD OF TECHNOLOGY

The following relates generally to wireless communications, and more specifically to out-of-order scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a timing between the receipt of a downlink transmission and a subsequent transmission (e.g., either uplink or downlink) for a UE may be flexible. For instance, a UE may receive downlink data and respond to a base station with an acknowledgment (ACK) or negative acknowledgment (NACK) an amount of time after the downlink data is received. This timing may be based on the UE's capabilities and signaled to the UE in the downlink transmission, allowing enough time for the UE to decode and process the downlink data and any information therein (such as an uplink grant, a downlink grant, etc.). In some cases, however, the timing may not account for the type of service used, particularly when a service type may vary between respective transmissions.

SUMMARY

The described techniques relate to improved methods, systems, devices, or apparatuses that support out-of-order scheduling. Generally, the described techniques provide for out-of-order scheduling for transmissions including different service types. For example, a user equipment (UE) may receive a first downlink transmission followed by a second downlink transmission. While processing the first downlink transmission, the UE may identify a first transmission (e.g., in response to or granted by the first downlink transmission) that is scheduled, where the first transmission includes a first service type. Additionally, the UE may process the second downlink transmission and identify a second transmission (e.g., in response to or as granted by the second downlink transmission) that is scheduled, where the second transmission may include a second service type that is associated with high-priority communications (such as an ultra-reliable low latency communications (URLLC) service). The UE may determine that the second transmission is scheduled to begin before (or at the same time as) the first transmission despite reception of the first downlink transmission (or a grant for the first transmission) occurring sooner. As a result, the UE may transmit the second transmission based on the scheduling order. Additionally or alternatively, the UE may transmit the second transmission on a priority of channels associated with the first and second transmissions. For example, the priority of the channels may be indicated to the UE, and the UE may transmit the second transmission based on a priority of a channel associated with the second transmission. In such cases, the second transmission (e.g., scheduled based on a grant of the second downlink transmission) may not be associated with a low-priority channel. In some cases, the first transmission may be associated with a high-priority channel.

A method of wireless communication is described. The method may include identifying that a first transmission has a first priority, the first transmission associated with a first downlink transmission, identifying that a second transmission has a second priority greater than the first priority, the second transmission associated with a second downlink transmission that occurs after the first downlink transmission, determining an order for beginning the second transmission relative to the first transmission based on the second transmission having the second priority, and transmitting the second transmission based on the determined order, where the second transmission begins before the first transmission, at least partially overlaps with the first transmission, or a combination thereof.

An apparatus for wireless communication is described. The apparatus may include a processor, memory coupled with the processor, and instructions stored in the memory. The instructions may be executable by the processor to cause the apparatus to identify that a first transmission has a first priority, the first transmission associated with a first downlink transmission, identify that a second transmission has a second priority greater than the first priority, the second transmission associated with a second downlink transmission that occurs after the first downlink transmission, determine an order for beginning the second transmission relative to the first transmission based on the second transmission having the second priority, and transmit the second transmission based on the determined order, where the second transmission begins before the first transmission, at least partially overlaps with the first transmission, or a combination thereof.

Another apparatus for wireless communication is described. The apparatus may include means for identifying that a first transmission has a first priority, the first transmission associated with a first downlink transmission, identifying that a second transmission has a second priority greater than the first priority, the second transmission associated with a second downlink transmission that occurs after the first downlink transmission, determining an order for beginning the second transmission relative to the first transmission based on the second transmission having the second priority, and transmitting the second transmission based on the determined order, where the second transmission begins before the first transmission, at least partially overlaps with the first transmission, or a combination thereof.

A non-transitory computer-readable medium storing code for wireless communication is described. The code may include instructions executable by a processor to identify that a first transmission has a first priority, the first transmission associated with a first downlink transmission, identify that a second transmission has a second priority greater than the first priority, the second transmission associated with a second downlink transmission that occurs after the first downlink transmission, determine an order for beginning the second transmission relative to the first transmission based on the second transmission having the second priority, and transmit the second transmission based on the determined order, where the second transmission begins before the first transmission, at least partially overlaps with the first transmission, or a combination thereof.

Some examples of the method, apparatuses, and non-transitory computer-readable medium described herein may further include operations, features, means, or instructions for determining a first duration between the first downlink transmission and the first transmission and a second duration between the second downlink transmission and the second transmission that may be less than the first duration, and determining that the second transmission may be scheduled to begin before the first transmission, at least partially overlap with the first transmission, or a combination thereof based on the second duration being less than the first duration.

Some examples of the method, apparatuses, and non-transitory computer-readable medium described herein may further include operations, features, means, or instructions for identifying that a third transmission may have the second priority, the third transmission associated with a third downlink transmission that occurs after the second downlink transmission, and determining a second order for beginning the third transmission relative to the first transmission based on the third transmission and the second transmission having a same priority.

Some examples of the method, apparatuses, and non-transitory computer-readable medium described herein may further include operations, features, means, or instructions for transmitting the second transmission based on the determined second order, where the third transmission begins before the first transmission, at least partially overlaps with the first transmission, or a combination thereof.

In some examples of the method, apparatuses, and non-transitory computer-readable medium described herein, the second transmission may be transmitted before the third transmission.

Some examples of the method, apparatuses, and non-transitory computer-readable medium described herein may further include operations, features, means, or instructions for identifying that a fourth transmission may have the second priority, the fourth transmission associated with a fourth downlink transmission that occurs after the third downlink transmission, receiving, via downlink control information (DCI), an indication that the beginning of the third transmission may be scheduled after the beginning of the fourth transmission, at least partially overlaps with the fourth transmission, or a combination thereof, dropping the third transmission based on the indication, and transmitting the fourth transmission.

Some examples of the method, apparatuses, and non-transitory computer-readable medium described herein may further include operations, features, means, or instructions for identifying that a fourth transmission may have the second priority, the fourth transmission associated with a fourth downlink transmission that occurs after the third downlink transmission, receiving, via DCI, an indication that the beginning of the third transmission may be scheduled after the beginning of the fourth transmission, at least partially overlaps with the fourth transmission, or a combination thereof, dropping the fourth transmission based on the indication, and transmitting the third transmission.

Some examples of the method, apparatuses, and non-transitory computer-readable medium described herein may further include operations, features, means, or instructions for identifying that a fourth transmission may have the second priority, the fourth transmission associated with a fourth downlink transmission that occurs after the third downlink transmission, receiving, via DCI, an indication that the beginning of the third transmission may be scheduled after the beginning of the fourth transmission, at least partially overlaps with the fourth transmission, or a combination thereof, and identifying a scheduling error based on the indication.

Some examples of the method, apparatuses, and non-transitory computer-readable medium described herein may further include operations, features, means, or instructions for dropping the first transmission based on a capability to begin transmitting the second transmission before the first transmission, at least partially overlap with the first transmission, or a combination thereof.

Some examples of the method, apparatuses, and non-transitory computer-readable medium described herein may further include operations, features, means, or instructions for transmitting the first transmission and the second transmission may be based on the first transmission and the second transmission satisfying a communications constraint associated with the first priority, the second priority, or both, and where the communications constraint includes: a number of component carriers, a transport block size, a number of layers, a number of resource blocks (RBs), a number of symbol period for control information, a modulation and coding scheme (MCS), or a combination thereof.

In some examples of the method, apparatuses, and non-transitory computer-readable medium described herein, the second transmission includes a hybrid automatic repeat request (HARQ) acknowledgment/negative acknowledgment (ACK/NACK) in response to the second downlink transmission, the second downlink transmission including a PDSCH.

In some examples of the method, apparatuses, and non-transitory computer-readable medium described herein, the second transmission includes a physical uplink shared channel (PUSCH) based on a resource grant included in the second downlink transmission, the second downlink transmission including a physical downlink control channel (PDCCH).

In some examples of the method, apparatuses, and non-transitory computer-readable medium described herein, the second transmission includes a physical downlink shared channel (PDSCH) based on a resource grant included in the second downlink transmission, the second downlink transmission including a PDCCH.

In some examples of the method, apparatuses, and non-transitory computer-readable medium described herein, the first transmission includes a first service type.

In some examples of the method, apparatuses, and non-transitory computer-readable medium described herein, the second transmission includes a second service type that may be associated with high-priority communications.

DETAILED DESCRIPTION

Figure 1:
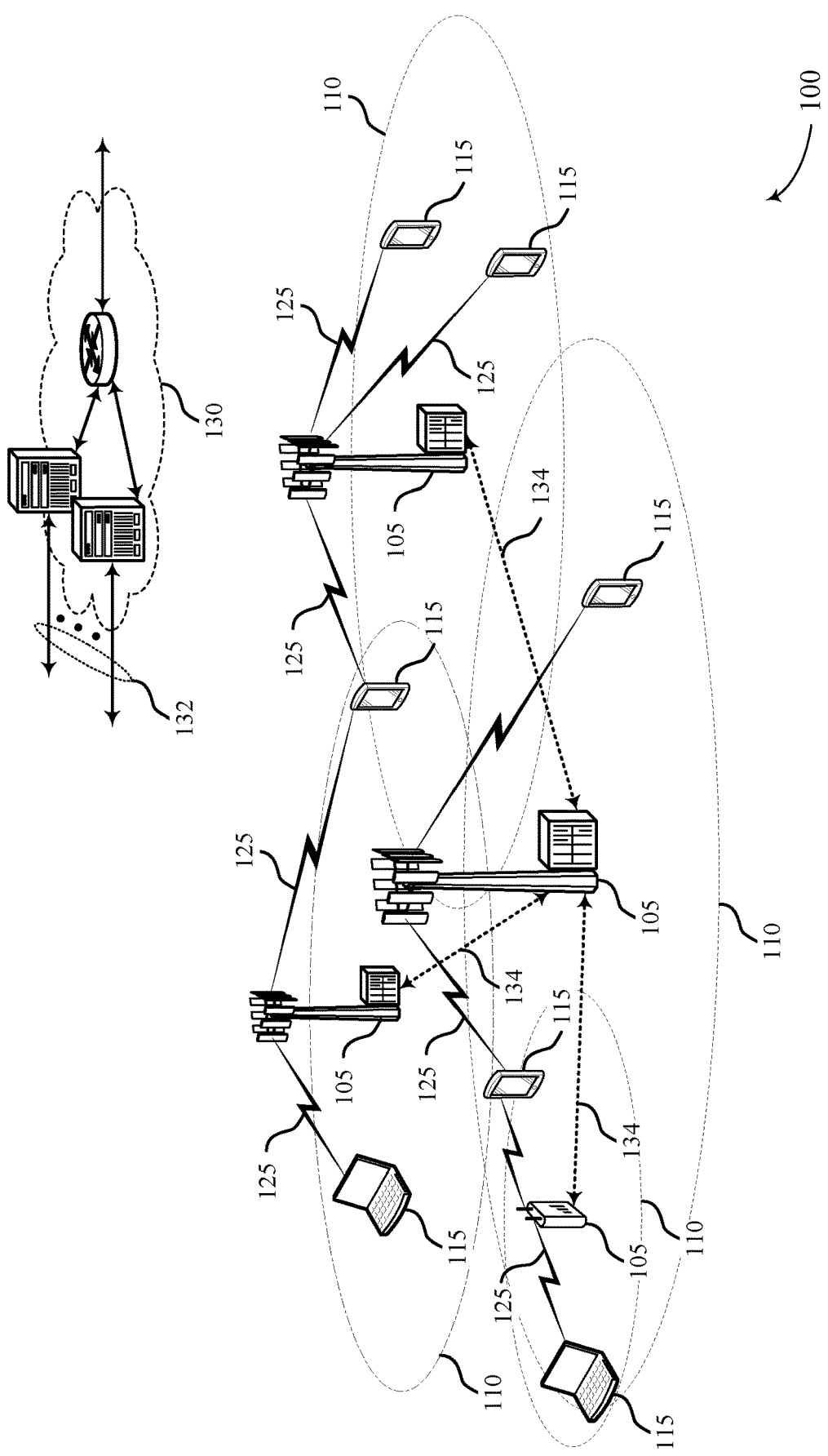
FIG. 1 illustrates an example of a wireless communications system that supports out-of-order scheduling in accordance with aspects of the present disclosure.

In some wireless communications systems, a timing between the receipt of a downlink transmission and a subsequent transmission (e.g., either uplink or downlink) for a user equipment (UE) may be flexible. For instance, a UE may receive downlink data and respond to a base station with an acknowledgment (ACK) or negative acknowledgment (NACK) some amount of time after the downlink data is received, where the UE identifies the scheduling of the ACK/NACK while processing the received downlink transmission. The timing of the scheduled feedback may be based on the UE's capabilities and signaled to the UE in the downlink transmission, allowing enough time for the UE to decode and process the downlink data and any information therein (such as an uplink grant, a downlink grant, etc.). As an example, a first capability (e.g., Cap1) and a second capability (e.g., Cap2) may be defined for UEs within a system, and may be based on a UE's hardware or processing ability.

In some cases, the timing between a downlink transmission and an associated uplink or downlink transmission may be indicated in downlink control information (DCI) transmitted from a base station. The base station may flexibly configure different time frames for transmissions following a downlink transmission, which may be based on the UE's capabilities. As a result, the flexibility in the timing between a downlink transmission and a subsequent transmission (e.g., in response to or based on information included in the downlink transmission) may enable out-of-order scheduling decisions.

In one example, of out-of-order scheduling, a first downlink transmission may have a first hybrid automatic repeat request (HARQ) identifier (ID) (e.g., HARQ ID 0). A timing for a responsive HARQ transmission by the UE may be configured to be a number of transmission time intervals (TTIs) (e.g., seven symbol periods) after the first downlink transmission is received. Additionally, a second downlink transmission, received after the first downlink transmission, may have a second HARQ ID (e.g., HARQ ID 1) that indicates a shorter timeframe for a responsive HARQ transmission (e.g., two symbol periods). As a result, the UE may transmit feedback for HARQ ID 1 before transmitting the feedback for HARQ ID 0, despite the first downlink transmission corresponding to HARQ ID 0 being received first, thus resulting in the so-called out-of-order scheduling. As another example, physical uplink shared channel (PUSCH) transmissions may be considered out-of-order. For instance, a first physical downlink control channel (PDCCH) may schedule (e.g., grant) a first PUSCH transmission, and a second PDCCH (e.g., received after the first PDCCH) may schedule a second PUSCH transmission. Here, the resources allocated for the second PUSCH transmission may occur prior to (or at the same time as) the resources granted for the first PUSCH transmission, and thus be considered "out-of-order." In some cases, out-of-order scheduling may be allowed across respective channels with different priorities, processing timing capabilities, service types, or a combination thereof.

In some communications systems, however, out-of-order scheduling may not be allowed, or may only be allowed when all transmissions in the system include a single service type. For instance, out-of-order scheduling may be disallowed for all service types, requiring that in-order scheduling be utilized in the system. In such systems, HARQ ACK/NACK corresponding to a first physical downlink shared channel (PDSCH) must be completed before another PDSCH may be scheduled. Further, even if the scheduling allocations are associated with different UE processing timings, the scheduling may be expected to be in order in such systems.

But in systems that support multiple service types, in-order scheduling may result in delayed transmissions for some services, including high-priority communications (such as ultra-reliable low latency communications (URLLC)), which may be a service based on implicit or explicit indications (e.g., based on network conditions or direct signaling to the UE)). In cases where in-order scheduling is imposed, a subsequent transmission associated with the URLLC service (either uplink or downlink) may not be scheduled until a transmission associated with a different service (such as enhanced mobile broadband (eMBB)) is sent, due to the order in which the corresponding downlink transmissions for each service were received. As such, despite URLLC providing support for delay-sensitive traffic, URLLC transmissions may be unnecessarily delayed due to the inability to perform out-of-order scheduling. Similarly, some systems may support channels having different priorities with respect to other channels (e.g., a channel may have a first priority whereas another channel may have a second priority that is higher or lower than the first priority), and in-order scheduling may impact a device's ability to transmit such channels based on their respective priorities.

As described herein, out-of-order scheduling techniques may provide for increased communications efficiency and reduced latency in systems utilizing multiple service types and/or utilizing channels having different priorities. For example, out-of-order scheduling (e.g., for HARQ ACK/NACK reporting, PUSCH transmissions, PDSCH transmissions following PDCCH, or the like) may be allowed between transmissions of a first service type or first priority (e.g., eMBB) and transmissions of a second service type or second priority (e.g., URLLC). Such techniques may enable transmissions for a service having higher priority (e.g., as compared to another service type or priority) to be sent more quickly than transmissions of the other service type or of lower priority, thereby prioritizing traffic based on the service type and reducing or eliminating communications delays. Additionally or alternatively, priorities of channels may be indicated and may or may not be based on service type. If the priorities of channels are indicated, a channel assigned a high priority may be transmitted more quickly than a channel that was not assigned a priority. In some cases, out-of-order scheduling may be used when a shorter processing timing (e.g., between receipt of a downlink transmission and a subsequent transmission) is associated with service types associated with a reliability threshold and a latency threshold (e.g., high-priority communications). In addition, for transmissions including the same service type (e.g., across multiple eMBB transmissions or across multiple URLLC transmissions), scheduling may be in order. That is, respective transmissions of different service types may utilize out-of-order scheduling while respective transmissions of a same service type may utilize in-order scheduling.

Aspects of the subject matter described herein may be implemented to realize one or more advantages. The described techniques may support improvements in scheduling techniques for increased communications efficiency, and reduced latency in systems utilizing multiple service types and channels having different priorities, among other advantages. As such, supported techniques may include improved network operations, enhanced efficiency, and, in some examples, may promote network flexibility, among other benefits.

Aspects of the disclosure are initially described in the context of a wireless communications system. Further examples are then provided that illustrate out-of-order scheduling configurations for different service types or priorities and in-order scheduling for the same service type or priority. Aspects of the disclosure are further illustrated by and described with reference to apparatus diagrams, system diagrams, and flowcharts that relate to jumbo radio resource control message delivery.

FIG. 1 illustrates an example of a wireless communications system 100 that supports out-of-order scheduling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the prioritization of service types through modified scheduling orders for transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined PHY layer structure for supporting communications over a communication link 125. For example, a carrier of a communication link 125 may include a portion of a radio frequency spectrum band that is operated according to PHY layer channels for a given radio access technology. Each PHY layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that may support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

HARQ may be a method of ensuring that data is received correctly over a wireless communication link 125. HARQ may include a combination of error detection (e.g., using a CRC), FEC, and retransmission (e.g., ARQ). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information.

PDCCH carries DCI in control channel elements (CCEs), which may consist of nine logically contiguous resource element groups (REGs), where each REG contains 4 REs. DCI includes information regarding downlink scheduling assignments, uplink resource grants, transmission scheme, uplink power control, HARQ information, MCS and other information. The size and format of the DCI messages may differ depending on the type and amount of information that is carried by the DCI. For example, if spatial multiplexing is supported, the size of the DCI message is large compared to contiguous frequency allocations. Similarly, for a system that employs MIMO, the DCI may include additional signaling information. DCI size and format depend on the amount of information as well as factors such as bandwidth, the number of antenna ports, and duplexing mode.

The PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the UE, a limited set of CCE locations may be specified for DCI associated with a specific UE 115. CCEs may be grouped (e.g., in groups of 1, 2, 4 and 8 CCEs), and a set of CCE locations in which the UE may find relevant DCI may be specified. These CCEs may be known as a search space. The search space may be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE-specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

The physical uplink control channel (PUCCH) may be mapped to a control channel defined by a code and two consecutive resource blocks (RBs). Uplink control signaling may depend on the presence of timing synchronization for a cell. PUCCH resources for SR and channel quality indicator (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Wireless communications system 100 may support out-of-order scheduling for transmissions including different service types and/or priorities. For example, a UE 115 may receive a first downlink transmission followed by a second downlink transmission. While processing the first downlink transmission, the UE 115 may identify a first transmission (e.g., in response to, or granted by the first downlink transmission) that is scheduled, where the first transmission includes a first service type or may have a first priority (e.g., the first transmission may include a channel having the first priority). Additionally, the UE 115 may process the second downlink transmission and identify a second transmission (e.g., in response to, or granted by the second downlink transmission) that is scheduled, where the second transmission may include a second service type or may have a second priority that is associated with a reliability threshold and a latency threshold (e.g., URLLC, high-priority communications) or high-priority communications (e.g., the second transmission may include a channel having the second priority). The UE 115 may determine that the second transmission is scheduled before the first transmission, despite reception of the first downlink transmission (or a grant for the first transmission) occurring sooner. As a result, the UE 115 may transmit or receive the second transmission before the first transmission based on the scheduling order. In other examples, the UE 115 may transmit the second transmission on a priority of channels associated with the first and second transmissions. For example, the priority of the channels may be indicated to the UE 115 by a base station 105. The UE 115 may transmit the second transmission based on a priority of a channel associated with the second transmission, where the second transmission may be associated with a high-priority channel. In some examples, the first transmission may be associated with a high-priority channel or a low-priority channel.

Figure 2:
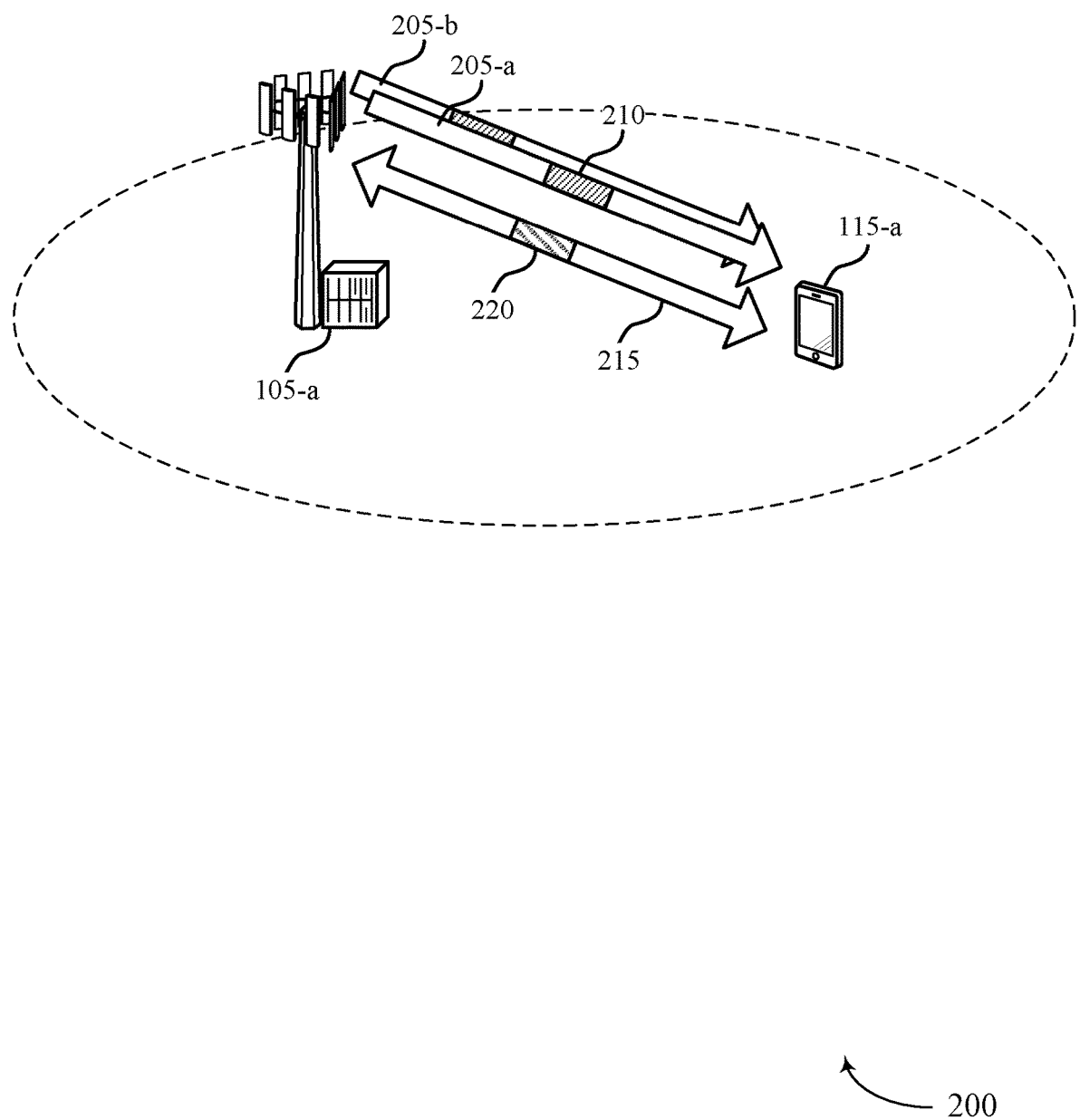
FIG. 2 illustrates an example of a wireless communications system that supports out-of-order scheduling in accordance with aspects of the present disclosure.

FIG. 2 illustrates an example of a wireless communications system 200 that supports out-of-order scheduling in accordance with aspects of the present disclosure. In some examples, wireless communications system 200 may implement aspects of wireless communications system 100. For example, wireless communications system 200 may include a base station 105-a and a UE 115-a, which may be examples of the corresponding devices described with reference to FIG. 1. Wireless communications system 200 may support the use of out-of-order scheduling between different service types or different priorities.

In wireless communications system 200, base station 105-a may send data and control information to UE 115-a via downlink transmissions 205-a and 205-b, each of which may include one or more channels 210 (e.g., PDCCH, PDSCH). Additionally, a transmission 215 may be scheduled by base station 105-a for communication with UE 115-a after a downlink transmission 205. A transmission 215 may be associated with a respective downlink transmission 205. For instance, the transmission 215 may be an uplink transmission from UE 115-a, and may include a channel 220 that includes uplink data, or may include HARQ feedback for data previously received via a PDSCH of a downlink transmission 205. Additionally or alternatively, transmission 215 may include downlink data from base station 105-a, which may have been scheduled via a downlink grant received via a PDCCH in the downlink transmission 205. Other signals may be sent between base station 105-a and UE 115-a using the channel 210 of the downlink transmission 205 and the channel 220 of the transmission 215.

A timing between the receipt of a downlink transmission 205 and transmission 215 (e.g., either uplink or downlink) for UE 115-a may be flexible. For instance, UE 115-a may receive downlink data and respond to base station 105-a with an ACK or NACK a certain amount of time after the downlink data is received. This timing may be based on capabilities of UE 115-a, and the timing may be signaled to UE 115-a in the downlink transmission 205, and may allow enough time for UE 115-a to decode and process the downlink data and any information therein (such as an uplink grant, a downlink grant, etc.). As an example, a first capability (e.g., Cap1) and a second capability (e.g., Cap2) may be defined for UEs 115 (e.g., including UE 115-a) within a system, and may be based on hardware or processing ability of a UE 115. The first capability may generally be associated with relatively longer processing timings than the second capability. Further, each capability may include timings, N1 and N2, that correspond to a duration between an uplink transmission 215 and a received downlink transmission 205. In such cases, N1 may represent a duration or number of TTIs between the receipt of a PDSCH and transmitting HARQ feedback, whereas N2 may represent a duration or number of TTIs between the receipt of a PDCCH and transmitting a PUSCH. Accordingly, base station 105-a may schedule uplink transmissions in accordance with the different capabilities, and corresponding to N1 and/or N2 based on the type of response to downlink transmissions 205.

In some cases, the timing between downlink transmission 205 and an associated uplink or downlink transmission 215 may be indicated in DCI transmitted from base station 105-a (e.g., sent in downlink transmission 205). That is, base station 105-a may flexibly configure different timeframes for transmissions 215 following a downlink transmission 205, which may be based on capabilities of UE 115-a (e.g., to process the downlink transmission 205 and perform functions based on the information within the downlink transmission 205). Accordingly, the timing between, for example, a PDCCH transmission (e.g., on channel 210) and associated HARQ feedback (e.g., ACK/NACK on channel 220) may be flexibly configured for respective transmissions. Likewise, the timing between PDCCH and an associated PUSCH transmission from UE 115-a (e.g., where an uplink grant is provided via the PDCCH) or an associated PDSCH transmission to UE 115-a (e.g., where a downlink grant is provided via the PDCCH) may be flexibly configured. In any event, the flexibility in the timing between a downlink transmission 205 and a subsequent transmission 215 (e.g., in response to, or based on information included in the downlink transmission 205) may enable out-of-order scheduling decisions.

In one example, of out-of-order scheduling, data sent via a channel 210 of a first downlink transmission 205-a may have a first HARQ ID (e.g., HARQ ID 0) where a timing for a responsive HARQ transmission 215 by UE 115-a may be configured to be a number of TTIs (e.g., seven symbol periods) after the first downlink transmission 205-a is received. Additionally, data sent via a channel 210 of a second downlink transmission 205-b, received after the first downlink transmission 205-a, may have a second HARQ ID (e.g., HARQ ID 1) that indicates a shorter timeframe for a responsive HARQ transmission (e.g., two symbol periods). As a result, UE 115-a may transmit feedback for HARQ ID 1 before transmitting the feedback for HARQ ID 0, despite the first downlink transmission 205-a corresponding to HARQ ID 0 being received first, thus resulting in the so-called out-of-order scheduling. Out-of-order scheduling may not only be based on the time of transmission or reception; the order of scheduling grants may also indicate out-of-order scheduling. For example, a first PUSCH may be sent after (or at the same time as) a second PUSCH that is granted after the first PUSCH. As mentioned above, different timings may be used between different transmissions, and it is noted that the out-of-order scheduling may be applicable for transmissions 215 other than HARQ feedback. Thus, the HARQ example above is provided for illustrative clarity, and the timing between receipt of various downlink channels and subsequent transmission of uplink/downlink channels may also be flexibly configured to allow for out-of-order scheduling decisions.

In some communications systems, out-of-order scheduling may not be allowed, or may only be allowed when all transmissions in the system include a single service type or have a same priority. That is, out-of-order scheduling may be disallowed, such that in-order scheduling be utilized in the system (e.g., where HARQ ACK/NACK corresponding to a first PDSCH may be completed before another PDSCH may be scheduled). Further, even if the scheduling allocations are associated with different UE processing timings described herein, the scheduling may be expected to be in order. For instance, if a first PDSCH is scheduled with a first timing (e.g., N1) of the first capability, another PDSCH may not be scheduled even with a first timing (e.g., N1) of the second capability until the HARQ ACK/NACK corresponding to the first PDSCH is sent. These same rules may apply to scheduling PUSCH corresponding to a received PDSCH.

Wireless communications system 200 may support multiple service types or priorities, and in-order scheduling may result in delayed transmissions 215 for services having latency and reliability requirements below a threshold (such as URLLC, which may be a service based on implicit or explicit indications (e.g., based on network conditions or direct signaling to UE 115-a)). As an example of how in-order scheduling may affect URLLC services, a first downlink transmission 205-a (e.g., PDSCH) may include a first type of service (e.g., eMBB, or another type of service) and a second downlink transmission 205-B (e.g., PDSCH) received after the first downlink transmission 205-a, may include a second service type (e.g., URLLC). A first service type may also correspond to transmissions of channels having a first priority and a second service type may correspond to transmissions of channels having a second priority. For instance, different channels (e.g., PDCCH, PDSCH, PUCCH, PUSCH, etc.) may each have different priorities for transmission by a wireless device, which may be based on the information carried by each channel. In cases where in-order scheduling is imposed, a subsequent transmission 215 associated with the URLLC service or higher-priority channel (either uplink or downlink) may not be scheduled until a subsequent transmission associated with the eMBB services or lower-priority channel is sent because of the order in which the downlink transmissions 205 were received. As such, despite the support for delay-sensitive traffic provided by URLLC, URLLC transmissions may be unnecessarily delayed due to the inability to perform out-of-order scheduling.

Wireless communications system 200 may support out-of-order scheduling techniques that provide for increased communications efficiency and reduced latency for multiple service types and channel priorities. For example, out-of-order scheduling (e.g., HARQ ACK/NACK reporting, PUSCH transmissions, PDSCH transmissions following PDCCH, or the like) may be allowed between transmissions of a first service type or first priority (e.g., eMBB) and transmissions of a second service type or second priority higher than the first priority (e.g., URLLC). Such techniques may enable transmissions including the service type having a high priority (e.g., as compared to the other service type) to be sent more quickly than transmissions of the other service type having a relatively lower priority, thereby prioritizing traffic based on the service type and/or priority.

The described techniques may provide for out-of-order scheduling when a shorter processing timing (e.g., between receipt of a downlink transmission and a subsequent transmission) is associated with service types or channels associated with a reliability threshold and a latency threshold (e.g., high-priority communications, such as URLLC). In addition, for transmissions including the same service type or priority (e.g., across multiple eMBB transmissions or across multiple URLLC transmissions), scheduling may be in order. That is, respective transmissions of different service types or priorities may utilize out-of-order scheduling, whereas respective transmissions of a same service type or priority may utilize in-order scheduling.

UE 115-a may use a variety of different techniques to distinguish between different service types and priorities. As an example, UE 115-a may use techniques to explicitly differentiate between eMBB traffic and URLLC traffic. In another example, UE 115-a may implicitly differentiate between eMBB traffic and URLLC traffic. In some cases, priorities for some transmissions may be indicated to UE 115-a.

Examples of explicit techniques may include, among others, an indication field in the DCI, an indication based on a compact DCI (e.g., for HARQ-ACK, PUSCH, asynchronous channel state information (A-CSI), or asynchronous-SRS (A-SRS), or a combination thereof), information based on a search space or a control resource set (CORESET), information based on a bandwidth part (BWP), information based on radio network temporary identifier (RNTI) masking, information based on one or more TRP IDs, or information based on PDCCH scrambling, or a combination thereof.

Examples of implicit techniques may include, among others, determining whether the uplink channel carries channel state information (CSI) for processes whose block error rate (BLER) target is lower than the eMBB service, determining if the uplink channel is associated with a DCI detected by a new RNTI in the UE-specific search space (USS), determining if the new CQI table is used in reporting a CSI on one channel, or determining if the UE processing time is capped at a first value or a second value (e.g., determining if one of the channels follows the Cap2 N1/N2 values, while the other follows Cap1 N1/N2 values).

Figure 3:
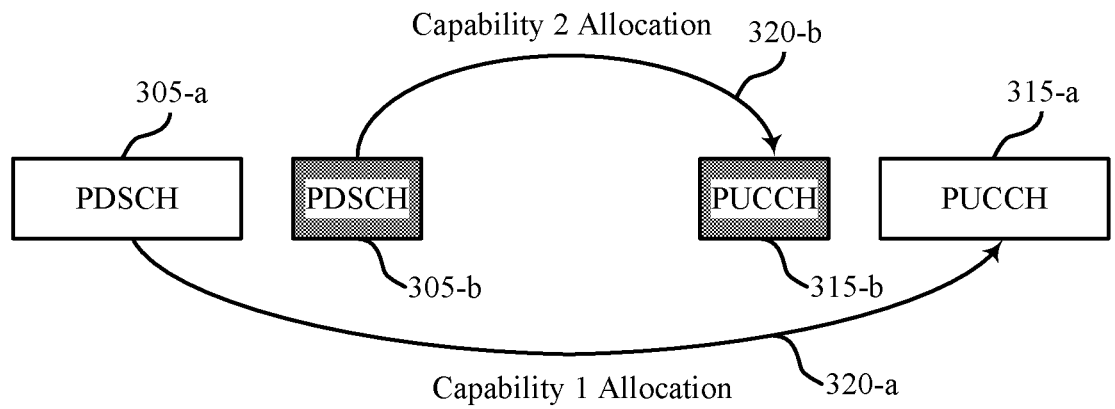
FIG. 3 illustrates an example of an out-of-order scheduling configuration that supports out-of-order scheduling in accordance with aspects of the present disclosure.
Figure 3:
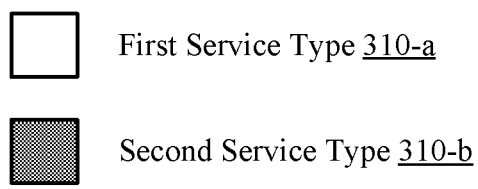

FIG. 3 illustrates an example of an out-of-order scheduling configuration 300 that supports out-of-order scheduling in accordance with aspects of the present disclosure. In some examples, out-of-order scheduling configuration 300 may implement aspects of wireless communications system 100. For example, out-of-order scheduling configuration 300 may be configured by a base station 105, and used by a UE 115 such as described with reference to FIGS. 1 and 2.

Out-of-order scheduling configuration 300 illustrates the scheduling of multiple downlink transmissions 305 and associated transmissions, where transmissions responsive to, or based on, the downlink transmissions 305 may be transmitted in an order that is different from the order in which the respective downlink transmissions 305 were received. For example, a first downlink transmission 315-a may be transmitted by a base station 105 and received at a UE 115. The first downlink transmission 305-a may include PDSCH as illustrated, or may include another channel. The base station may also transmit, after the first downlink transmission 305-a, a second downlink transmission 305-b that is received by the UE 115, and may also include PDSCH (or another channel). Each downlink transmission 305 may be for or include different types of services and/or may have different channel priorities. For instance, the first downlink transmission 305-a may include a first service type 310-a (e.g., eMBB) whereas the second downlink transmission 305-b may include a second service type 310-b (different from the first service type 310-a) that is associated with a reliability threshold and a latency threshold or high-priority communications (e.g., URLLC). The first service type 310-a may also correspond to transmissions of a channel having a first priority, and the second service type 310-b may correspond to transmissions of a channel having a second priority that is greater than the first priority, and should be considered as such herein.

The receipt of first downlink channel 305-*a* may indicate that the UE 115 is to transmit HARQ ACK/NACK in response to the first downlink channel 305-*a*, where the HARQ ACK/NACK may be transmitted using a first transmission 315-*a* (e.g., including PUCCH). Likewise, the UE 115 may also transmit HARQ ACK/NACK using a second transmission 315-*b* (e.g., including PUCCH) in response to receiving the second downlink transmission 305-*b*. As described herein, the transmissions 315 associated with different service types 310 may be scheduled out-of-order, where the HARQ ACK/NACK may be sent in an order that enables the prioritization of some service types 310 (e.g., URLLC) over other service types 310 (e.g., eMBB). For example, the base station 105 may indicate (e.g., via DCI within the first downlink transmission 305-*a*) a timing 320-*a* for the second transmission 315-*a* (which may be associated with a Cap1 allocation). Likewise, the base station 105 may indicate a timing 320-*b* for the second transmission 315-*b* (which may be associated with a Cap2 allocation). In some cases, there may be a first PDCCH that may grant the first PUSCH and there may be a second PDCCH received after the first PDCCH that may grant a second PUSCH, where the second PUSCH may be scheduled to occur before the first PUSCH. The timings 320 may accordingly indicate to the UE 115 a scheduling order for the first transmission 315-*a* and the second transmission 315-*b* such that the second transmission 315-*b* is transmitted before the first transmission 315-*a*. In some cases, the second transmission 315-*b* may be transmitted such that it at least partially overlaps with the first transmission 315-*a*. For instance, the second transmission 315-*b* and the first transmission 315-*a* may begin at a same OFDM symbol period. Thus, it is understood that the second transmission 315-*b* may not be completed before the first transmission 315-*a* is started (and vice versa) and the two transmissions 315 may overlap (but still be considered out-of-order). The UE 115 may determine the scheduling order from the base station 105 via DCI signaling. In some cases, the scheduling order may be based on a service type 310 included in the first transmission 315-*a* and/or the second transmission 315-*b*. Additionally, the out-of-order scheduling between the different service types 310 described may correspond to a shorter timing 320 being associated with the second service type 310 associated with the reliability threshold and the latency threshold.

As mentioned herein, the illustrated example of HARQ feedback for received downlink data is one application of the out-of-order scheduling configuration 300, and other channels may be transmitted out-of-order. For example, the downlink transmissions 305 may include a PDCCH and the transmissions 315 may include PDSCH (e.g., in accordance with a downlink resource grant provided in the PDCCH). Additionally or alternatively, the downlink transmissions 305 may include a PDCCH and the transmissions 315 may include a PUSCH enabling the UE 115 to transmit uplink data (e.g., in accordance with an uplink resource grant provided in the PDCCH). Out-of-order scheduling of other channels or combinations of uplink and downlink transmissions not explicitly mentioned herein may also be possible.

In some cases, there may be different types of UEs 115 within a wireless communications system based on their capability to support out-of-order scheduling. For example, there may be UEs 115 that support out-of-order scheduling without any limitations or constraints (e.g., based on hardware configurations, such as chip size), and UEs 115 that may only support out-of-order scheduling with some limitations (e.g., where these UEs 115 may have hardware or functions shared between different service types due to limited chip area). In the latter case, the ability to support out-of-order transmissions may be based on the UE's capabilities, where the UE 115 may determine the timing 320 for respective transmission based on an earlier downlink transmissions 305 associated with different service types 310 and priorities. In such cases, once the transmission 315-*b* (e.g., channel) with the faster turnaround time (e.g., timing 320-*b*) is scheduled, a longer pending channel (e.g., first transmission 315-*a*) being processed by the UE 115 may be dropped. That is, the UE 115 may determine that the timing 320-*a* between the first downlink transmission 305-*a* and the associated transmission 315-*a* is greater than the timing 320-*b* between the second downlink transmission 305-*b* and the associated second transmission 315-*b* and drop the first transmission 315-*a*. In such cases, the UE 115 may receive the first downlink transmission 305-*a* and identify the scheduling of the first transmission 315-*a* in accordance with timing 320-*a*. The UE 115 may then receive the second downlink transmission 305-*b*, and identify the scheduling for the second transmission 315-*b* in accordance with timing 320-*b*. The UE 115 may determine, based on its capabilities whether the UE 115 may process both the first transmission 315-*a* and the second transmission simultaneously 315-*a*. If not, then the UE 115 may drop the first transmission 315-*a* based on the longer timing 320-*a*.

In other examples, the UE 115 may process both the first transmission 315-*a* and the second transmission 315-*b* based on one or more constraints associated with the first service type 310-*a*, or the second service type 310-*b*, or both. The per-service (or per-priority) or joint set of constraints may include a number of CCs, transport block sizes, a number of layers, a number of RBs, a number of symbols used for control information, MCS, etc. As an illustrative example, if a number of CCs for transmissions 315 associated with the first service type 310-*a*, or a number of CCs for transmissions 315 associated with the second service type 310-*b*, or a combination thereof, satisfy a threshold (e.g., are less than a threshold number of CCs), then the UE 115 may determine to process the scheduling of both the first transmission 315-*a* and the second transmission 315-*b*, and proceed to transmit both in accordance with the out-of-order scheduling configuration 300. In another example, respective transport block size for each service type 310 may be identified, and the constraints may enable the UE 115 to process and transmit both the first transmission 315-*a* and the second transmission 315-*b* as long as a sum of the respective transport block sizes are less than a threshold size.

Figure 4:
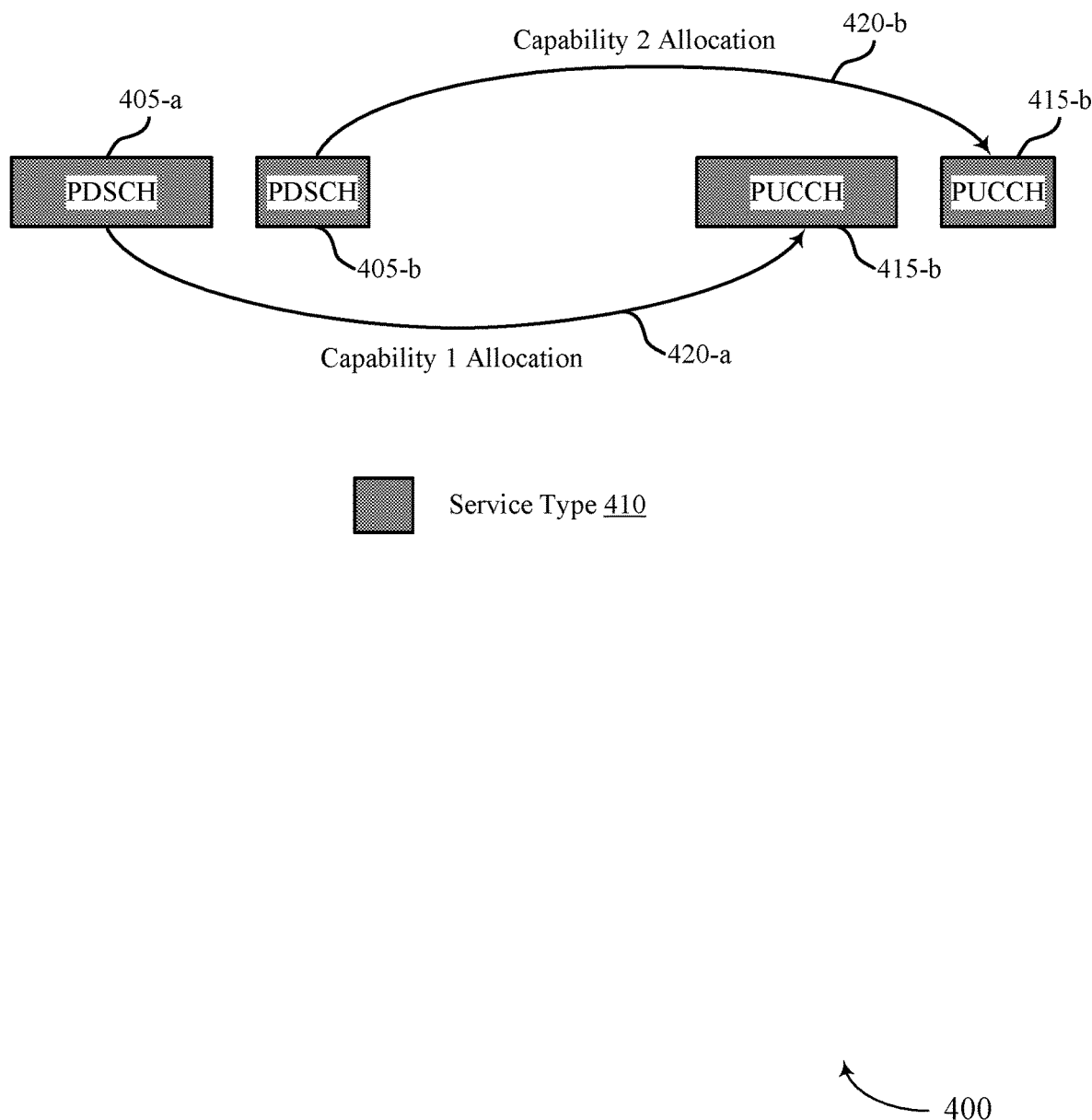
FIG. 4 illustrates an example of an in-order scheduling configuration that supports out-of-order scheduling in accordance with aspects of the present disclosure.

FIG. 4 illustrates an example of an in-order scheduling configuration 400 that supports out-of-order scheduling in accordance with aspects of the present disclosure. In some examples, in-order scheduling configuration 400 may implement aspects of wireless communications system 100. For example, in-order scheduling configuration 400 may be configured by a base station 105, and used by a UE 115 such as described with reference to FIG. 2. In-order scheduling configuration may support scheduling of transmissions including the same service type with in-order scheduling, while transmissions including different service types use out-of-order scheduling, as described with reference to FIG. 3.

In-order scheduling configuration 400 illustrates the scheduling of multiple downlink transmissions 405 and associated transmissions, where transmissions responsive to, or based on, the downlink transmissions 405 may be sent in an order that is the same as the order in which the respective downlink transmissions 405 were received. For example, a first downlink transmission 415-*a* may be transmitted by a base station 105 and received at a UE 115. The first downlink transmission 405-*a* may include PDSCH as illustrated, or may include another channel. The base station may also transmit, after the first downlink transmission 405-*a*, a second downlink transmission 405-*b* that is received by the UE 115, and may also include PDSCH (or another channel). Each downlink transmission 405 may be for or include the same type of service. For instance, the first downlink transmission 405-*a* and the second downlink transmission 405-*b* may include a same service type 410, which, in some cases, may be associated with a reliability threshold and a latency threshold (e.g., high-priority communications, such as URLLC). In other examples, the service type 410 may be different from URLLC, such as eMBB or other services. As described herein, a service type 410 may correspond to a channel having a respective priority.

The receipt of first downlink channel 405-*a* may indicate that the UE 115 is to transmit HARQ ACK/NACK in response, where the HARQ ACK/NACK may be transmitted using a first transmission 415-*a* (e.g., including PUCCH). Likewise, the UE 115 may also transmit HARQ ACK/NACK using a second transmission 415-*b* in response to receiving the second downlink transmission 405-*b*. As described herein, the transmissions 415 associated with the same service type 410 may be scheduled in-order while transmissions associated with different service types may be transmitted out-of-order. For example, the base station 105 may indicate (e.g., via DCI within the first downlink transmission 405-*a*) a timing 420-*a* for the second transmission 415-*a* (which may be associated with a Cap1 allocation). Likewise, the base station 105 may indicate a timing 420-*b* for the second transmission 415-*b* (which may be associated with a Cap2 allocation). The timings 420 may accordingly indicate to the UE 115 a scheduling order for the first transmission 415-*a* and the second transmission 415-*b* such that the second transmission 415-*b* is transmitted after the first transmission 415-*a*. The UE 115 may determine the scheduling order from the base station 105 via DCI signaling. In some cases, priorities may be assigned to a channel, which may or may not be based on service type 410. In some cases, first downlink transmission 405-*a* may not be assigned a priority and second downlink transmission 405-*b* may be assigned a high priority and second transmission 415-*b* may be transmitted before first transmission 415-*a*.

Based on the in-order scheduling of transmissions having the same service type, a UE 115 may expect that the scheduling will accordingly be in-order. As a result, in cases where transmissions including the same service type are scheduled out-of-order, the UE 115 may perform different processes when the out-of-order scheduling is identified. For example, the UE 115 may drop the first scheduled channel. Alternatively, the UE 115 may drop the second scheduled channel. In other examples, the UE 115 may not be expecting the out-of-order scheduling for transmissions of the same service type, which may result in the UE 115 identifying a case where the UE 115 was not aware of the base station 105 scheduling the transmissions including the same service type 410 out-of-order. That is, the UE 115 may identify a scheduling error when transmissions including the same service type 410 or having the same priority are out-of-order.

As a result of the different behaviors of the UE 115, a base station 105 may still schedule out-of-order transmissions for transmission of the same service type 410. For example, the base station 105 may know that the UE 115 may drop the second scheduled channel, and may accordingly proceed with scheduling the out-of-order transmissions for the same service type 410 based on a priority of the first scheduled channel, knowing that the second scheduled channel may be dropped.

Figure 5:
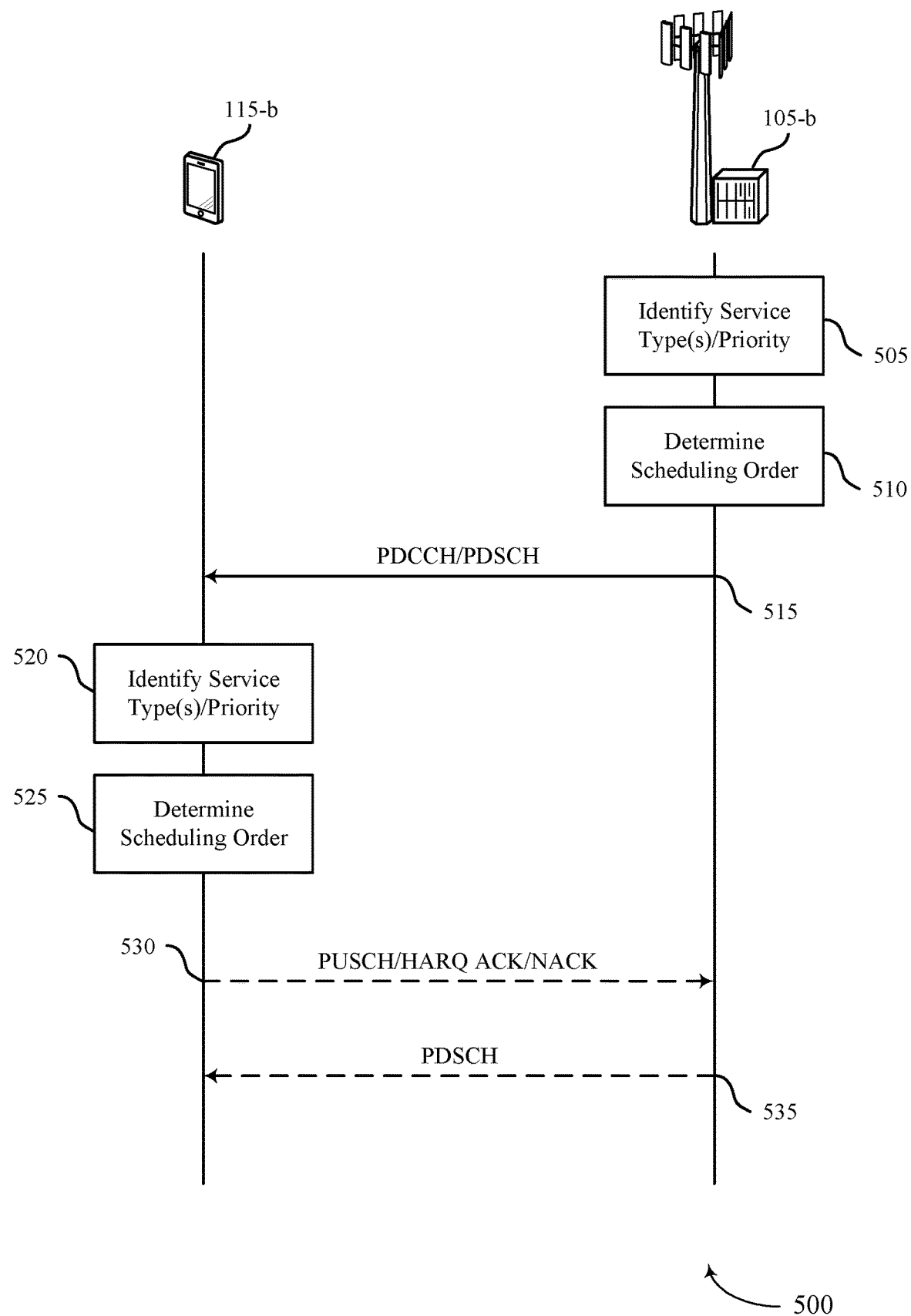
FIG. 5 illustrates an example of a process flow that supports out-of-order scheduling in accordance with aspects of the present disclosure.

FIG. 5 illustrates an example of a process flow 500 that supports out-of-order scheduling in accordance with aspects of the present disclosure. In some examples, process flow 500 may implement aspects of wireless communications system 100. For example, process flow includes a base station 105-*b* and UE 115-*b* that may be examples of the corresponding devices described with reference to FIGS. 1 and 2. Process flow may support the use of out-of-order scheduling for transmissions having a different type of service, and in-order scheduling of transmissions having a same type of service.

At 505, base station 105-*b* may identify that a first transmission associated with a first downlink transmission has a first priority and/or includes a first service type. For example, base station 105-*b* may schedule the first downlink transmission (e.g., including PDCCH or PDSCH) that is associated with the first priority or first service type, and may identify the first transmission having the first priority or including the first service type for UE 115-*b* to transmit HARQ feedback. In such cases, base station 105-*b* may identify a timeframe for UE 115-*b* to transmit the HARQ feedback using the first transmission based on the capabilities of UE 115-*b*, and include an indication of such timeframe in DCI. Base station 105-*b* may also identify that a second transmission has a second priority greater than the first priority and/or includes a second service type that is associated with a reliability threshold and a latency threshold (e.g., high-priority communications), the second transmission associated with a second downlink transmission that occurs after the first downlink transmission. Likewise, base station 105-*b* may identify a timeframe for UE 115-*b* to transmit the HARQ feedback using the second transmission based on the capabilities of UE 115-*b*, and include an indication of such timeframe in DCI. In other cases, the second transmission includes PUSCH based on a resource grant included in the second downlink transmission, the second downlink transmission including PDCCH. Additionally or alternatively, the second transmission includes PDSCH based on a resource grant included in the second downlink transmission, the second downlink transmission including PDCCH.

At 510, base station 105-*b* may determine a scheduling order for transmitting the second transmission before the first transmission based on the second transmission having the second priority or including the second service type. In some examples, base station 105-*b* may determine an order for beginning the second transmission relative to the first transmission based on the second transmission having the second priority or including the second service type. For instance, base station may determine that because of the second priority or second service type associated with a reliability threshold and a latency threshold (e.g., high-priority communications), and the first transmission is associated with a different priority or service type, the second transmission may be sent out-of-order (as compared to the order in which the downlink transmissions will be sent).

At 515, the base station 105-*b* may transmit, and UE 115-*b* may receive, the downlink transmissions. For example, base station may transmit a first PDCCH having the first priority or including the first service type followed by a second PDCCH have the second priority or including the second service type, and base station 105-*b* may then transmit a PDSCH having the second priority or including the second service type followed by a PDSCH having the first priority or including the first service type, in accordance with the determined scheduling order. In other examples, base station 105-*b* may transmit PDCCH including an uplink or downlink resource grant for UE 115-*b*, or may transmit PDSCH for which UE 115-*b* may subsequently transmit HARQ ACK/NACK.

At 520, UE 115-*b* may begin processing the first downlink transmission, and identify (e.g., within DCI) an indication of the scheduling of the first uplink transmission. In some cases, UE 115-*b* may identify that the first transmission associated with the first downlink transmission has the first priority or includes the first service type. Additionally, UE 119-*b* may subsequently receive and begin processing the second downlink transmission, and identify (e.g., within DCI) an indication of the scheduling of the second uplink transmission. In some cases, UE 115-*b* may identify that the second transmission associated with the second downlink transmission has the second priority or includes the second service type. In some cases, UE 115-*b* may identify the different priorities or service types based on implicit or explicit indications.

At 525, based on processing the received downlink transmissions, UE 115-*b* may a determine the scheduling order for transmitting the second transmission before the first transmission based on the second transmission having the second priority or including the second service type. In some cases, UE 115-*b* may determine a first duration between the first downlink transmission and the first transmission and a second duration between the second downlink transmission and the second transmission that is less than the first duration, and determine that the second transmission is to occur before the first transmission is based on the second duration being less than the first duration.

At 530, UE 115-*b* may transmit the second transmission before the first transmission based on the scheduling order. In some examples, UE 115-*b* may transmit the second transmission based on the determined order, where the second transmission begins before the first transmission, or at least partially overlaps with the first transmission, or a combination thereof. For example, UE 115-*b* may transmit HARQ ACK/NACK using the second transmission in response to the second downlink transmission including downlink data. Additionally or alternatively, UE 115-*b* may transmit uplink data using PUSCH using the second transmission in response to an uplink resource grant received at 515 in the second downlink transmission. In other examples, at 535, base station 105-*b* may transmit, and UE 115-*b* may receive, PDSCH in response to a PDCCH of the second downlink transmission sent at 515 that included a downlink resource grant.

In some cases, based on the scheduling order and processing of the downlink transmissions, UE 115-*b* may determine whether the UE 115-*b* is capable of supporting both the first transmission and the second transmission. If UE 115-*b* may support the out-of-order scheduling, UE 115-*b* may transmit the first transmission after transmitting the second transmission based on a capability to support the scheduling order for transmitting the second transmission before the first transmission. In other cases, UE 115-*b* may drop the first transmission based on a capability of UE 115-*b* to support the out-of-order scheduling.

Figure 6:
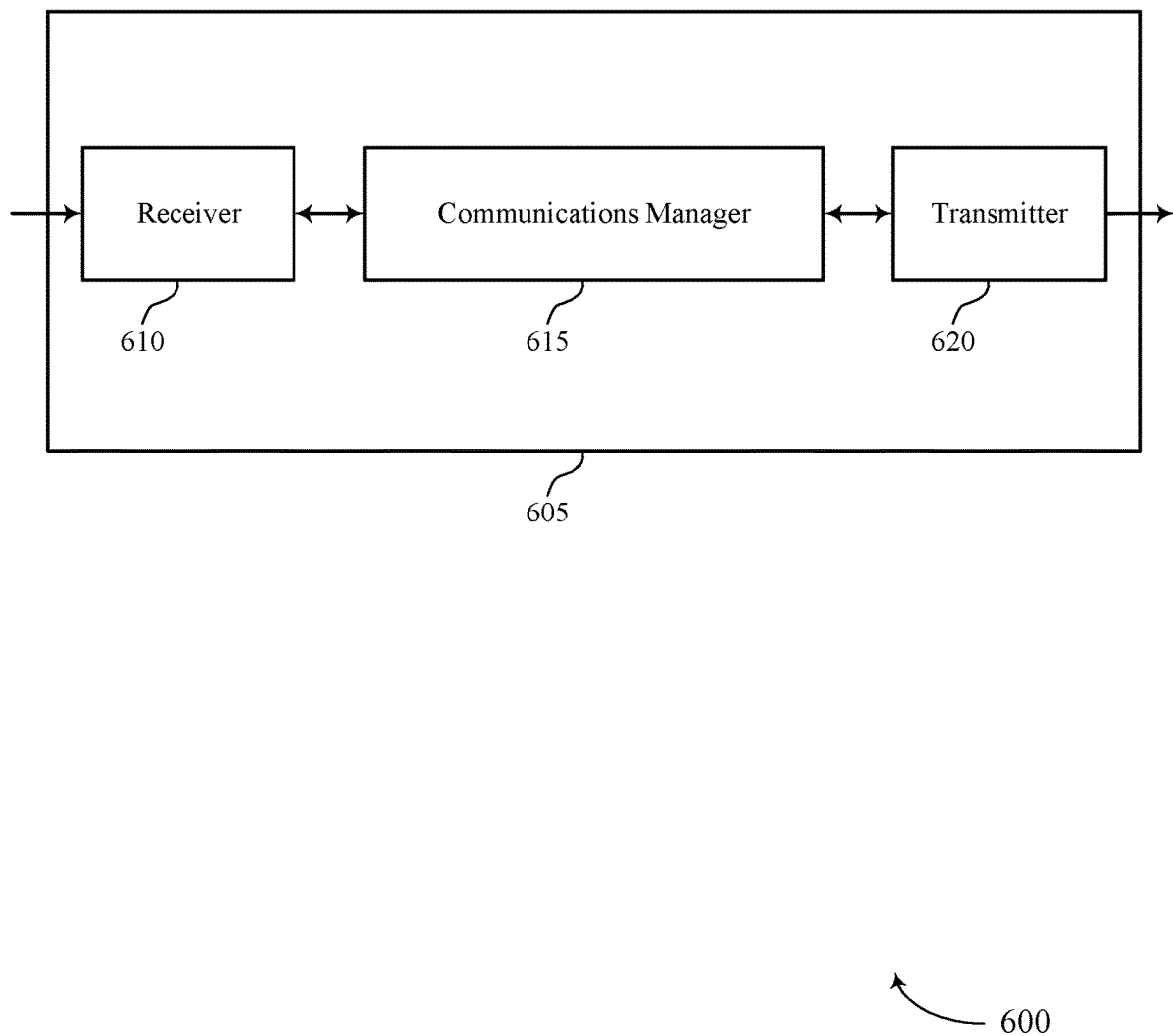
FIGS. 6 and 7 show block diagrams of devices that support out-of-order scheduling in accordance with aspects of the present disclosure.

FIG. 6 shows a block diagram 600 of a device 605 that supports out-of-order scheduling in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to out-of-order scheduling). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may identify that a first transmission associated with a first downlink transmission has a first priority or includes a first service type, identify that a second transmission has a second priority greater than the first priority or includes a second service type that is associated with a reliability threshold and a latency threshold (e.g., high-priority communications), the second transmission associated with a second downlink transmission that occurs after the first downlink transmission, determine a scheduling order for transmitting the second transmission before the first transmission based on the second transmission having a second priority or including the second service type, and transmit the second transmission before the first transmission based on the scheduling order. In some examples, the communications manager 615 may determine an order for beginning the second transmission relative to the first transmission based on the second transmission having the second priority or including the second service type. In some examples, communications manager 615 may transmit the second transmission based on the determined order, where the second transmission begins before the first transmission, or at least partially overlaps with the first transmission, or a combination thereof. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

The communications manager 615 described herein may be implemented to realize one or more potential advantages. One implementation may allow the device 605 to more efficiently coordinate communication between a base station or UE and the device 605, and more specifically to coordinate out-of-order scheduling in systems that utilize one or more priorities or service types. For example, the device 605 may identify an out-of-order scheduling configuration to use for transmissions of different priorities or service types, regardless of the order that the downlink transmissions were received, such that high-priority communications may be prioritized over other service types.

Based on implementing the out-of-order scheduling techniques described herein, a processor of a UE 115 (e.g., controlling the receiver 610, the transmitter 620, or the transceiver 920 as described with reference to FIG. 9) may increase communications efficiency, and reduce latency in systems utilizing multiple priorities or service types because there may be more flexibility to schedule transmissions based on priority or service type rather than downlink transmission order.

Figure 7:
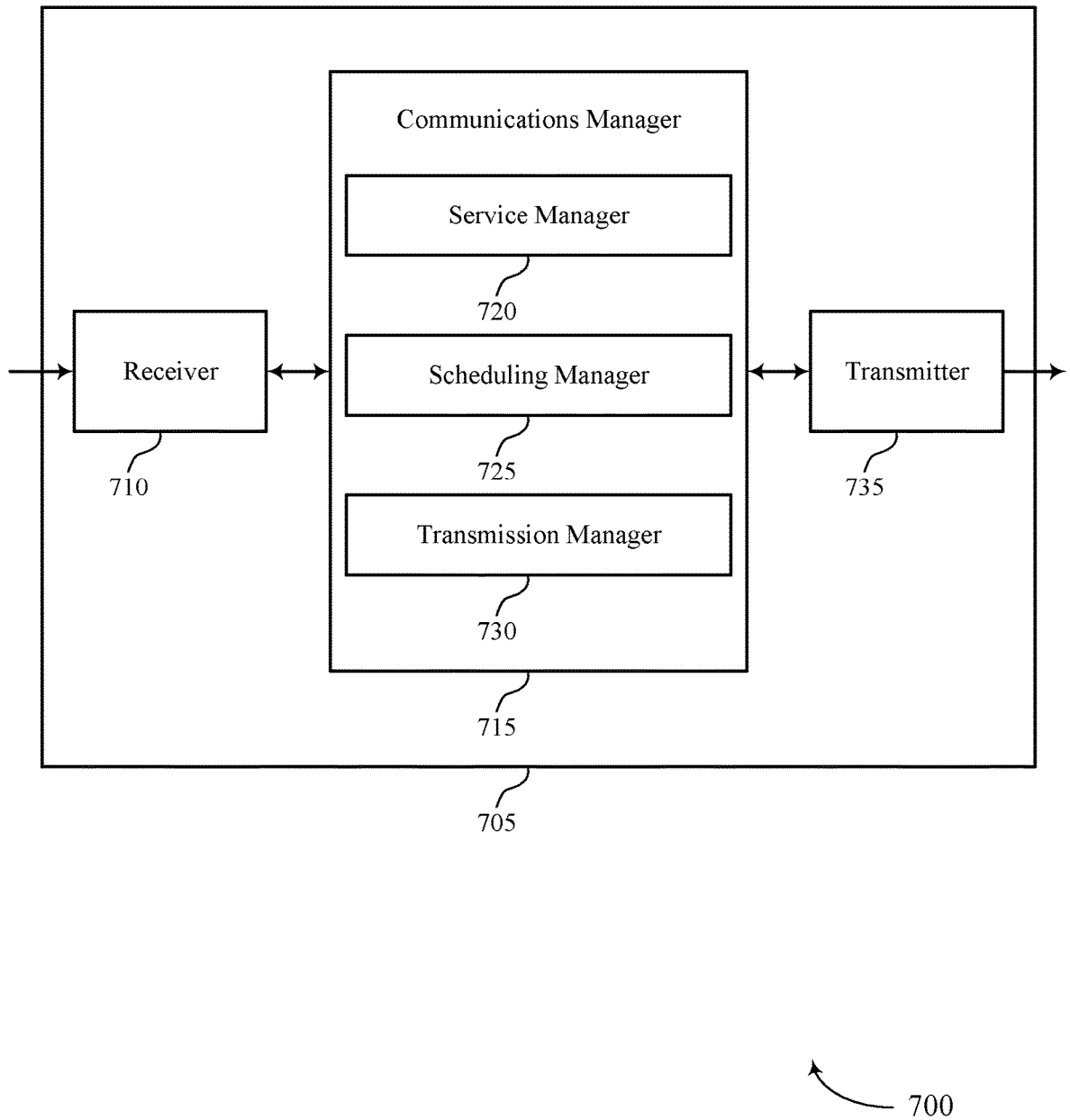

FIG. 7 shows a block diagram 700 of a device 705 that supports out-of-order scheduling in accordance with aspects of the present disclosure. The device 705 may be an example of aspects of a device 605, a UE 115, or a base station 105 as described herein. The device 705 may include a receiver 710, a communications manager 715, and a transmitter 735. The device 705 may also include a processor. Each of these components may be in communication with one another (e.g., via one or more buses).

Receiver 710 may receive information such as packets, user data, or control information associated with various information channels (e.g., control channels, data channels, and information related to out-of-order scheduling). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a service manager 720, a scheduling manager 725, and a transmission manager 730. The communications manager 715 may be an example of aspects of the communications manager 910 or 1010 as described herein.

The service manager 720 may identify that a first transmission associated with a first downlink transmission has a first priority or includes a first service type and identify that a second transmission has a second priority greater than the first priority or includes a second service type that is associated with a reliability threshold and a latency threshold (e.g., high-priority communications), the second transmission associated with a second downlink transmission that occurs after the first downlink transmission.

The scheduling manager 725 may determine a scheduling order for transmitting the second transmission before the first transmission based on the second transmission having the second priority or including the second service type. In some examples, the scheduling manager 725 may determine an order for beginning the second transmission relative to the first transmission based on the second transmission having the second priority or including the second service type. The transmission manager 730 may transmit the second transmission before the first transmission based on the scheduling order. In some examples, transmission manager 730 may transmit the second transmission based on the determined order, where the second transmission begins before the first transmission, or at least partially overlaps with the first transmission, or a combination thereof.

Transmitter 735 may transmit signals generated by other components of the device 705. In some examples, the transmitter 735 may be collocated with a receiver 710 in a transceiver module. For example, the transmitter 735 may be an example of aspects of the transceiver 920 or 1020 as described with reference to FIGS. 9 and 10. The transmitter 735 may utilize a single antenna or a set of antennas.

Figure 8:
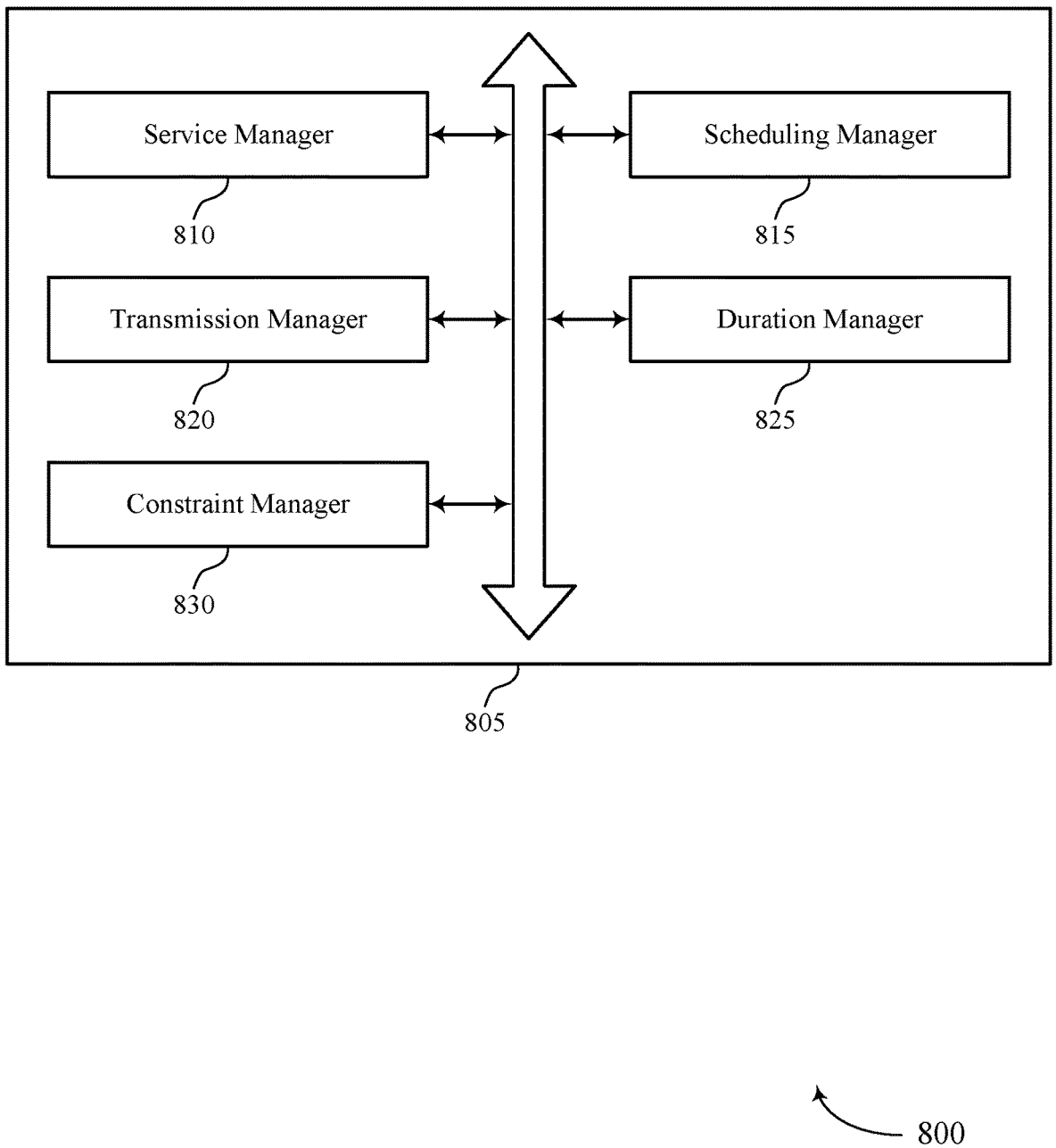
FIG. 8 shows a block diagram of a communications manager that supports out-of-order scheduling in accordance with aspects of the present disclosure.

FIG. 8 shows a block diagram 800 of a communications manager 805 that supports out-of-order scheduling in accordance with aspects of the present disclosure. The communications manager 805 may be an example of aspects of a communications manager 615, a communications manager 715, or a communications manager 910 described herein. The communications manager 805 may include a service manager 810, a scheduling manager 815, a transmission manager 820, a duration manager 825, and a constraint manager 830. Each of these modules may communicate, directly or indirectly, with one another (e.g., via one or more buses).

The service manager 810 may identify that a first transmission associated with a first downlink transmission has a first priority or includes a first service type. In some examples, the service manager 810 may identify that a second transmission has a second priority greater than the first priority or includes a second service type that is associated with a reliability threshold and a latency threshold (e.g., high-priority communications), the second transmission associated with a second downlink transmission that occurs after the first downlink transmission. In some cases, the first transmission is associated with a first service type. In some cases, the second transmission is associated with a second service type that is associated with high-priority communications.

In some examples, the service manager 810 may identify that a third transmission has the second priority or includes the second service type, the third transmission associated with a third downlink transmission that occurs after the second downlink transmission. In some examples, the service manager 810 may identify that a fourth transmission has the second priority or includes the second service type, the fourth transmission associated with a fourth downlink transmission that occurs after the third downlink transmission.

The scheduling manager 815 may determine a scheduling order for transmitting the second transmission before the first transmission based on the second transmission having the second priority or including the second service type. In some examples, the scheduling manager 815 may determine an order for beginning the second transmission relative to the first transmission based on the second transmission having the second priority or including the second service type. In some examples, the scheduling manager 815 may determine that the second transmission is scheduled before the first transmission is based on the second duration being less than the first duration. In some examples, the scheduling manager 815 may determine that the second transmission is scheduled to begin before the first transmission, or at least partially overlap with the first transmission, or a combination thereof based on the second duration being less than the first duration. In some examples, the scheduling manager 815 may determine a scheduling order for transmitting the third transmission before the first transmission based on the third transmission having the second priority or including the second service type and the second transmission having the second priority or including the second service type. In some examples, the scheduling manager 815 may determine a second order for beginning the third transmission relative to the first transmission based on the third transmission having the second priority or including the second service type and the second transmission having the second priority or including the second service type.

In some examples, the scheduling manager 815 may receive, via DCI, an indication that the third transmission is scheduled after the fourth transmission. In some examples, the scheduling manager 815 may receive, via DCI, an indication that the beginning of the third transmission is scheduled after the beginning of the fourth transmission, or at least partially overlaps with the fourth transmission, or a combination thereof. The transmission manager 820 may transmit the second transmission before the first transmission based on the scheduling order. In some examples, transmission manager 820 may transmit the second transmission based on the determined order, where the second transmission begins before the first transmission, or at least partially overlaps with the first transmission, or a combination thereof. In some examples, the transmission manager 820 may transmit the second transmission before the first transmission based on the scheduling order for transmitting the third transmission before the first transmission. In some examples, the transmission manager 820 may transmit the second transmission based on the determined order, where the third transmission begins before the first transmission, or at least partially overlaps with the first transmission, or a combination thereof. In some examples, the second transmission is transmitted before the third transmission.

In some examples, the transmission manager 820 may drop the third transmission based on the indication. In some examples, the transmission manager 820 may transmit the fourth transmission. In some examples, the transmission manager 820 may drop the fourth transmission based on the indication. In some examples, the transmission manager 820 may transmit the third transmission. In some examples, the transmission manager 820 may identify a scheduling error based on the indication. In some examples, the transmission manager 820 may drop the first transmission based on a capability to transmit the second transmission before the first transmission. In some examples, the transmission manager 820 may drop the first transmission based on a capability to begin transmitting the second transmission before the first transmission, or at least partially overlap with the first transmission. In some examples, the transmission manager 820 may transmit the first transmission after transmitting the second transmission based on a capability to support the scheduling order for transmitting the second transmission before the first transmission. In some cases, the second transmission includes a HARQ ACK/NACK in response to the second downlink transmission, the second downlink transmission including a PDSCH.

In some cases, the second transmission includes a PUSCH based on a resource grant included in the second downlink transmission, the second downlink transmission including a PDCCH. In some cases, the second transmission includes a PDSCH based on a resource grant included in the second downlink transmission, the second downlink transmission including a PDCCH. The duration manager 825 may determine a first duration between the first downlink transmission and the first transmission and a second duration between the second downlink transmission and the second transmission that is less than the first duration.

The constraint manager 830 may transmit the first transmission and the second transmission is based on the first transmission and the second transmission satisfying a communications constraint associated with the first priority or service type, the second priority or service type, or both. In some cases, where the communications constraint includes: a number of component carriers, a transport block size, a number of layers, a number of RBs, a number of symbol period for control information, an MCS, or a combination thereof.

Figure 9:
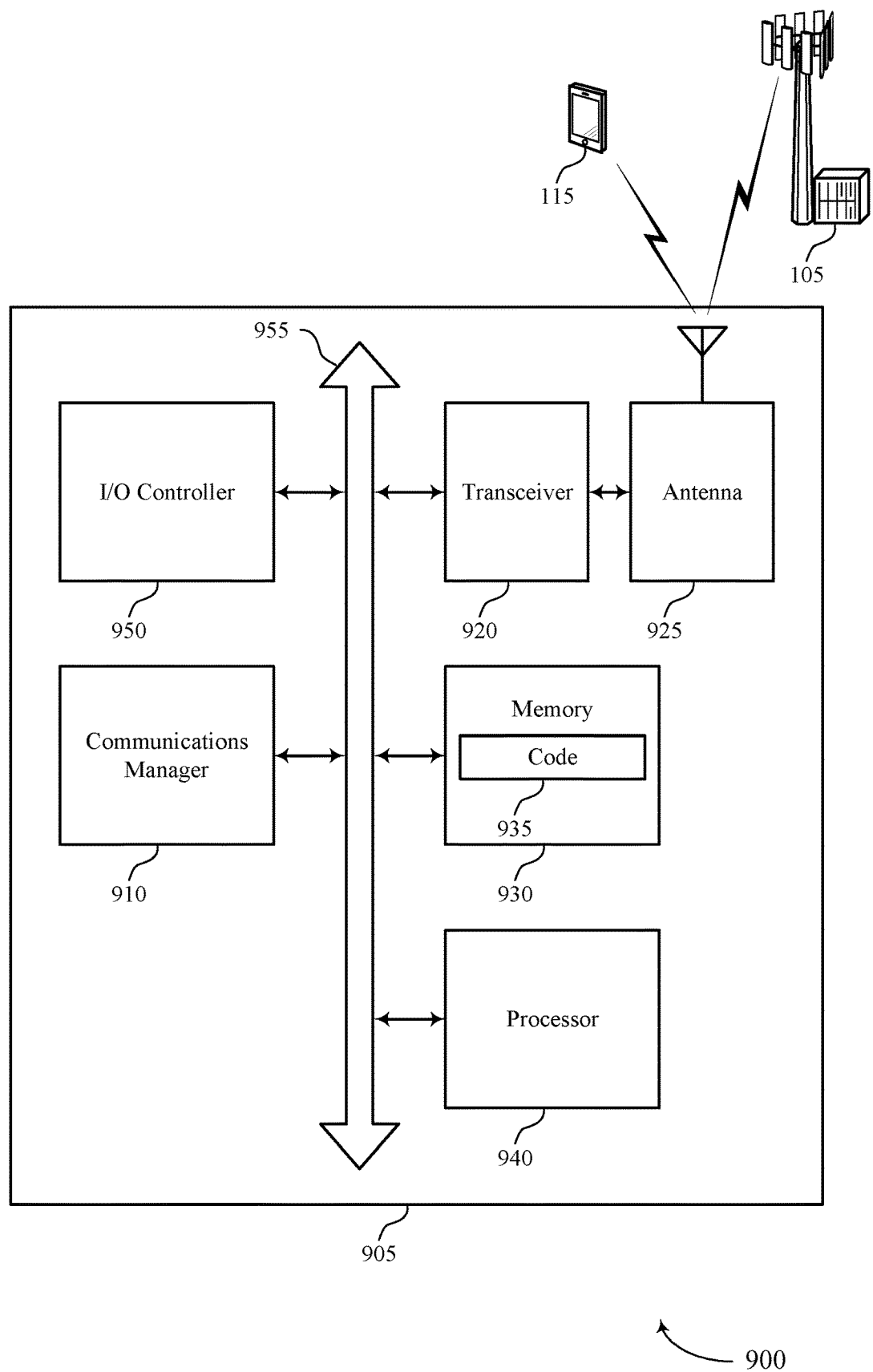
FIG. 9 shows a diagram of a system including a user equipment (UE) that supports out-of-order scheduling in accordance with aspects of the present disclosure.

FIG. 9 shows a diagram of a system 900 including a device 905 that supports out-of-order scheduling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may identify that a first transmission associated with a first downlink transmission includes a first service type, identify that a second transmission includes a second service type that is associated with a reliability threshold and a latency threshold (e.g., high-priority communications), the second transmission associated with a second downlink transmission that occurs after the first downlink transmission, determine a scheduling order for transmitting the second transmission before the first transmission based on the second transmission including the second service type, and transmit the second transmission before the first transmission based on the scheduling order. In some examples, the communications manager 910 may determine an order for beginning the second transmission relative to the first transmission based on the second transmission including the second service type. In some examples, communications manager 910 may transmit the second transmission based on the determined order, where the second transmission begins before the first transmission, or at least partially overlaps with the first transmission, or a combination thereof.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases, the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting out-of-order scheduling).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
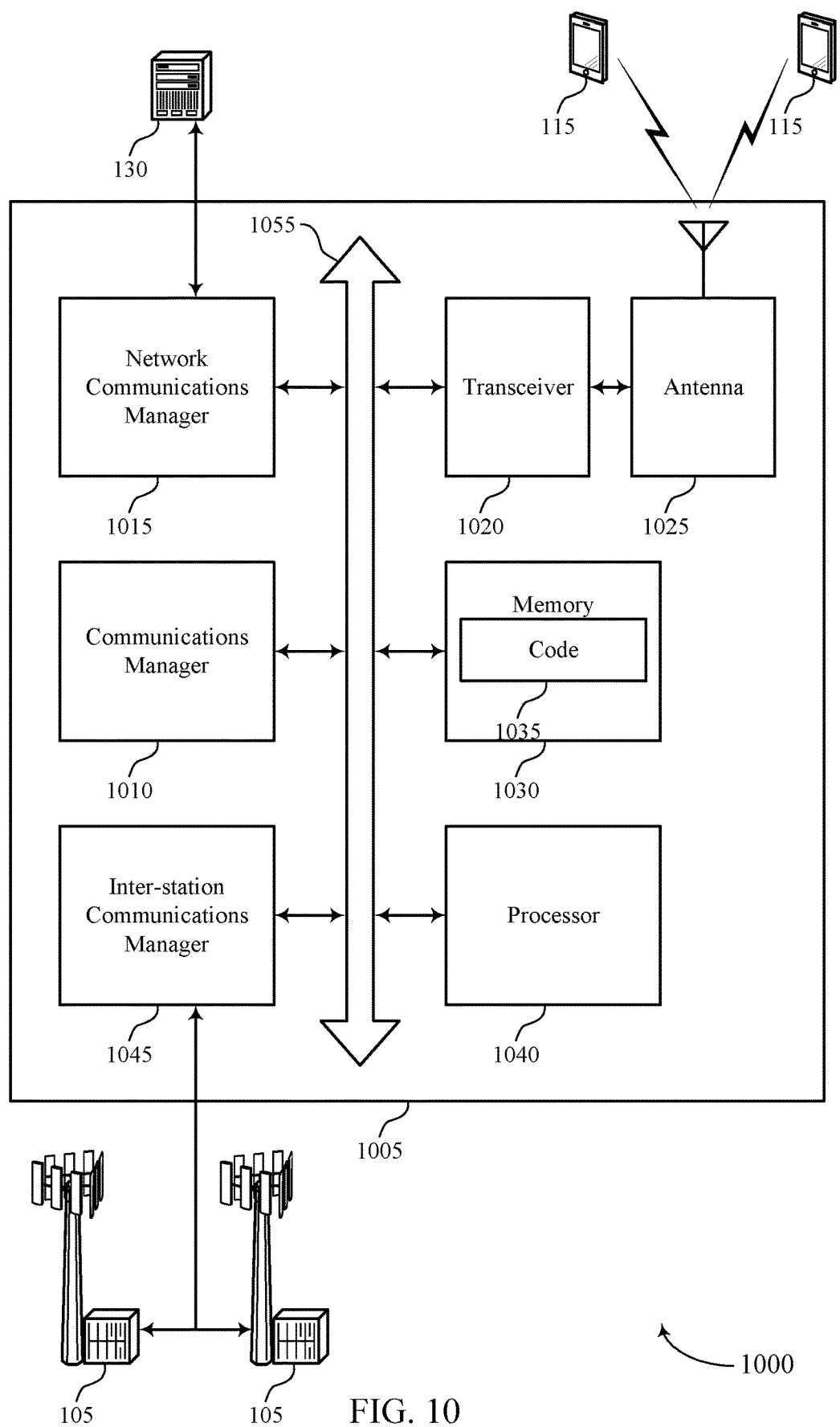
FIG. 10 shows a diagram of a system including a base station that supports out-of-order scheduling in accordance with aspects of the present disclosure.

FIG. 10 shows a diagram of a system 1000 including a device 1005 that supports out-of-order scheduling in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may identify that a first transmission associated with a first downlink transmission has a first priority or includes a first service type, identify that a second transmission has a second priority greater than the first priority or includes a second service type that is associated with a reliability threshold and a latency threshold (e.g., high-priority communications), the second transmission associated with a second downlink transmission that occurs after the first downlink transmission, determine a scheduling order for transmitting the second transmission before the first transmission based on the second transmission having the second priority or including the second service type, and transmit the second transmission before the first transmission based on the scheduling order. In some examples, the communications manager 1010 may determine an order for beginning the second transmission relative to the first transmission based on the second transmission having the second priority or including the second service type. In some examples, the communications manager 1010 may transmit the second transmission based on the determined order, where the second transmission begins before the first transmission, or at least partially overlaps with the first transmission, or a combination thereof.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases, the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting out-of-order scheduling).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
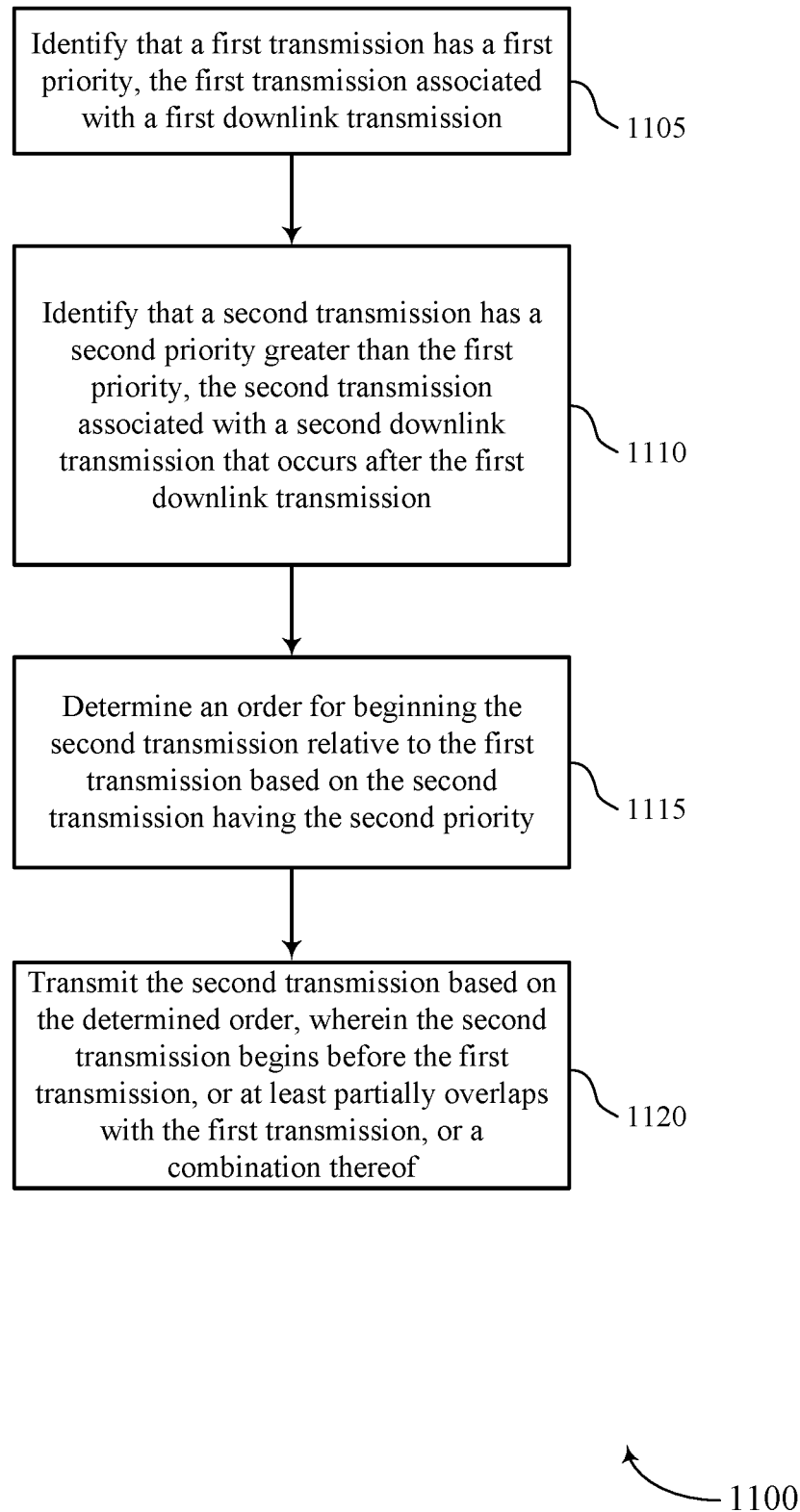
FIGS. 11 through 14 show flowcharts illustrating methods that support out-of-order scheduling in accordance with aspects of the present disclosure.

FIG. 11 shows a flowchart illustrating a method 1100 that supports out-of-order scheduling in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may identify that a first transmission has a first priority, the first transmission associated with a first downlink transmission. The operations of 1105 may be performed according to the methods described herein. In some examples, aspects of the operations of 1105 may be performed by a service manager as described with reference to FIGS. 6 through 10.

At 1110, the UE or base station may identify that a second transmission has a second priority greater than the first priority (e.g., the second transmission is associated with a reliability threshold and a latency threshold for high-priority communications), the second transmission associated with a second downlink transmission that occurs after the first downlink transmission. The operations of 1110 may be performed according to the methods described herein. In some examples, aspects of the operations of 1110 may be performed by a service manager as described with reference to FIGS. 6 through 10.

At 1115, the UE or base station may determine a scheduling order for transmitting the second transmission before the first transmission based on the second transmission having the second priority. In some examples, the UE or base station may determine an order for beginning the second transmission relative to the first transmission based on the second transmission having the second priority. The operations of 1115 may be performed according to the methods described herein. In some examples, aspects of the operations of 1115 may be performed by a scheduling manager as described with reference to FIGS. 6 through 10.

At 1120, the UE or base station may transmit the second transmission before the first transmission based on the scheduling order. In some examples, UE or base station may transmit the second transmission based on the determined order, where the second transmission begins before the first transmission, or at least partially overlaps with the first transmission, or a combination thereof. The operations of 1120 may be performed according to the methods described herein. In some examples, aspects of the operations of 1120 may be performed by a transmission manager as described with reference to FIGS. 6 through 10.

Figure 12:
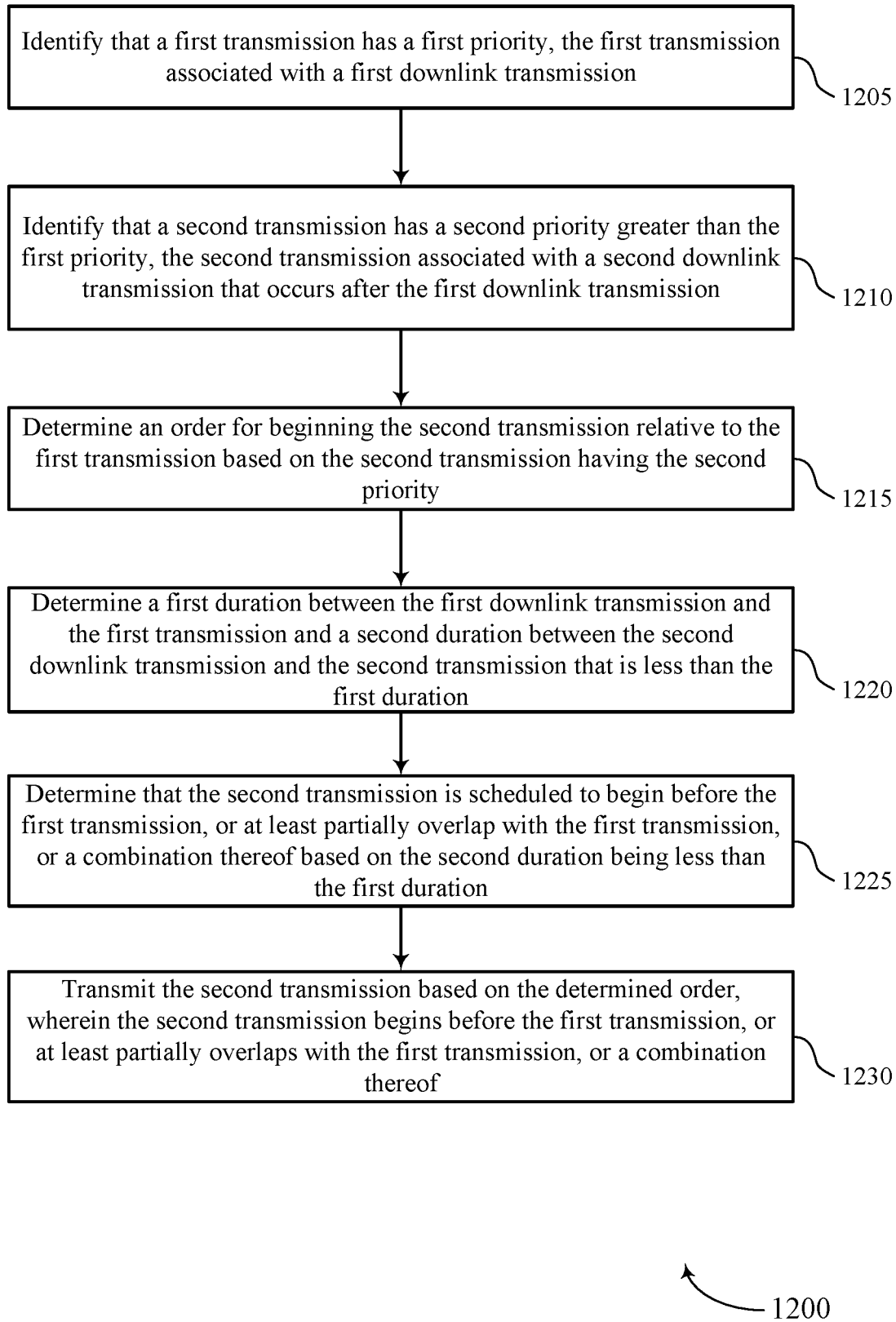

FIG. 12 shows a flowchart illustrating a method 1200 that supports out-of-order scheduling in accordance with aspects of the present disclosure. The operations of method 1200 may be implemented by a UE 115 or base station 105 or its components as described herein. For example, the operations of method 1200 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may identify that a first transmission has a first priority, the first transmission associated with a first downlink transmission. The operations of 1205 may be performed according to the methods described herein. In some examples, aspects of the operations of 1205 may be performed by a service manager as described with reference to FIGS. 6 through 10.

At 1210, the UE or base station may identify that a second transmission has a second priority greater than the first priority, the second transmission associated with a second downlink transmission that occurs after the first downlink transmission. The operations of 1210 may be performed according to the methods described herein. In some examples, aspects of the operations of 1210 may be performed by a service manager as described with reference to FIGS. 6 through 10.

At 1215, the UE or base station may determine a scheduling order for transmitting the second transmission before the first transmission based on the second transmission having the second priority. In some examples, the UE or base station may determine an order for beginning the second transmission relative to the first transmission based on the second transmission having the second priority. The operations of 1215 may be performed according to the methods described herein. In some examples, aspects of the operations of 1215 may be performed by a scheduling manager as described with reference to FIGS. 6 through 10.

At 1220, the UE or base station may determine a first duration between the first downlink transmission and the first transmission and a second duration between the second downlink transmission and the second transmission that is less than the first duration. The operations of 1220 may be performed according to the methods described herein. In some examples, aspects of the operations of 1220 may be performed by a duration manager as described with reference to FIGS. 6 through 10.

At 1225, the UE or base station may determine that the second transmission is scheduled before the first transmission is based on the second duration being less than the first duration. In some examples, the scheduling manager 815 may determine that the second transmission is scheduled to begin before the first transmission, or at least partially overlap with the first transmission, or a combination thereof based on the second duration being less than the first duration. The operations of 1225 may be performed according to the methods described herein. In some examples, aspects of the operations of 1225 may be performed by a scheduling manager as described with reference to FIGS. 6 through 10.

At 1230, the UE or base station may transmit the second transmission before the first transmission based on the scheduling order. In some examples, UE or base station may transmit the second transmission based on the determined order, where the second transmission begins before the first transmission, or at least partially overlaps with the first transmission, or a combination thereof. The operations of 1230 may be performed according to the methods described herein. In some examples, aspects of the operations of 1230 may be performed by a transmission manager as described with reference to FIGS. 6 through 10.

Figure 13:
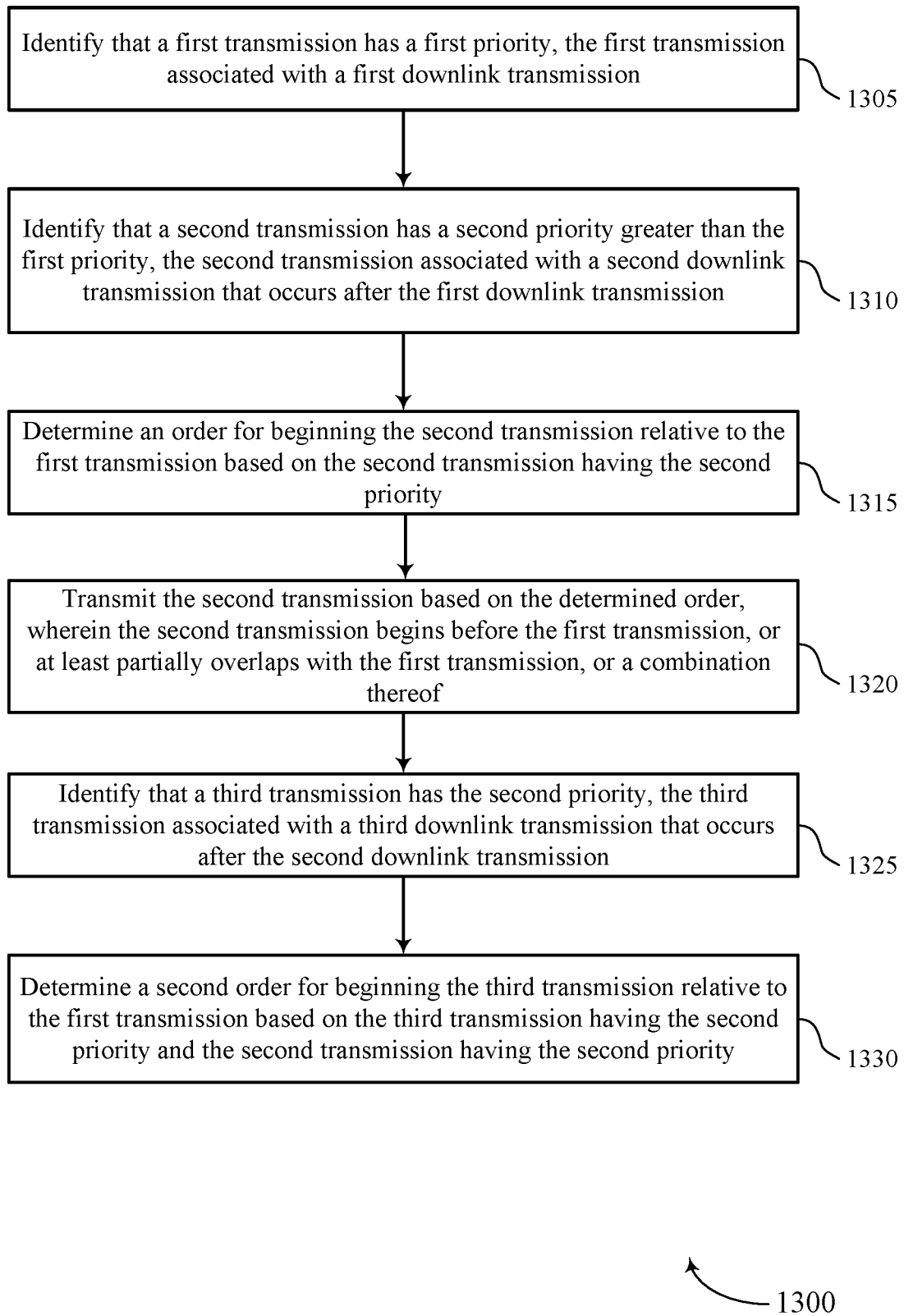

FIG. 13 shows a flowchart illustrating a method 1300 that supports out-of-order scheduling in accordance with aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may identify that a first transmission has a first priority, the first transmission associated with a first downlink transmission. The operations of 1305 may be performed according to the methods described herein. In some examples, aspects of the operations of 1305 may be performed by a service manager as described with reference to FIGS. 6 through 10.

At 1310, the UE or base station may identify that a second transmission has a second priority greater than the first priority, the second transmission associated with a second downlink transmission that occurs after the first downlink transmission. The operations of 1310 may be performed according to the methods described herein. In some examples, aspects of the operations of 1310 may be performed by a service manager as described with reference to FIGS. 6 through 10.

At 1315, the UE or base station may determine a scheduling order for transmitting the second transmission before the first transmission based on the second transmission having the second priority. In some examples, the UE or base station may determine an order for beginning the second transmission relative to the first transmission based on the second transmission having the second priority. The operations of 1315 may be performed according to the methods described herein. In some examples, aspects of the operations of 1315 may be performed by a scheduling manager as described with reference to FIGS. 6 through 10.

At 1320, the UE or base station may transmit the second transmission before the first transmission based on the scheduling order. In some examples, UE or base station may transmit the second transmission based on the determined order, where the second transmission begins before the first transmission, or at least partially overlaps with the first transmission, or a combination thereof. The operations of 1320 may be performed according to the methods described herein. In some examples, aspects of the operations of 1320 may be performed by a transmission manager as described with reference to FIGS. 6 through 10.

At 1325, the UE or base station may identify that a third transmission has the second priority, the third transmission associated with a third downlink transmission that occurs after the second downlink transmission. The operations of 1325 may be performed according to the methods described herein. In some examples, aspects of the operations of 1325 may be performed by a service manager as described with reference to FIGS. 6 through 10.

At 1330, the UE or base station may determine a scheduling order for transmitting the third transmission before the first transmission based on the third transmission having the second priority and the second transmission having the second priority. In some examples, the UE or base station may determine a second order for beginning the third transmission relative to the first transmission based on the third transmission having the second priority and the second transmission having the second priority. The operations of 1330 may be performed according to the methods described herein. In some examples, aspects of the operations of 1330 may be performed by a scheduling manager as described with reference to FIGS. 6 through 10.

Figure 14:
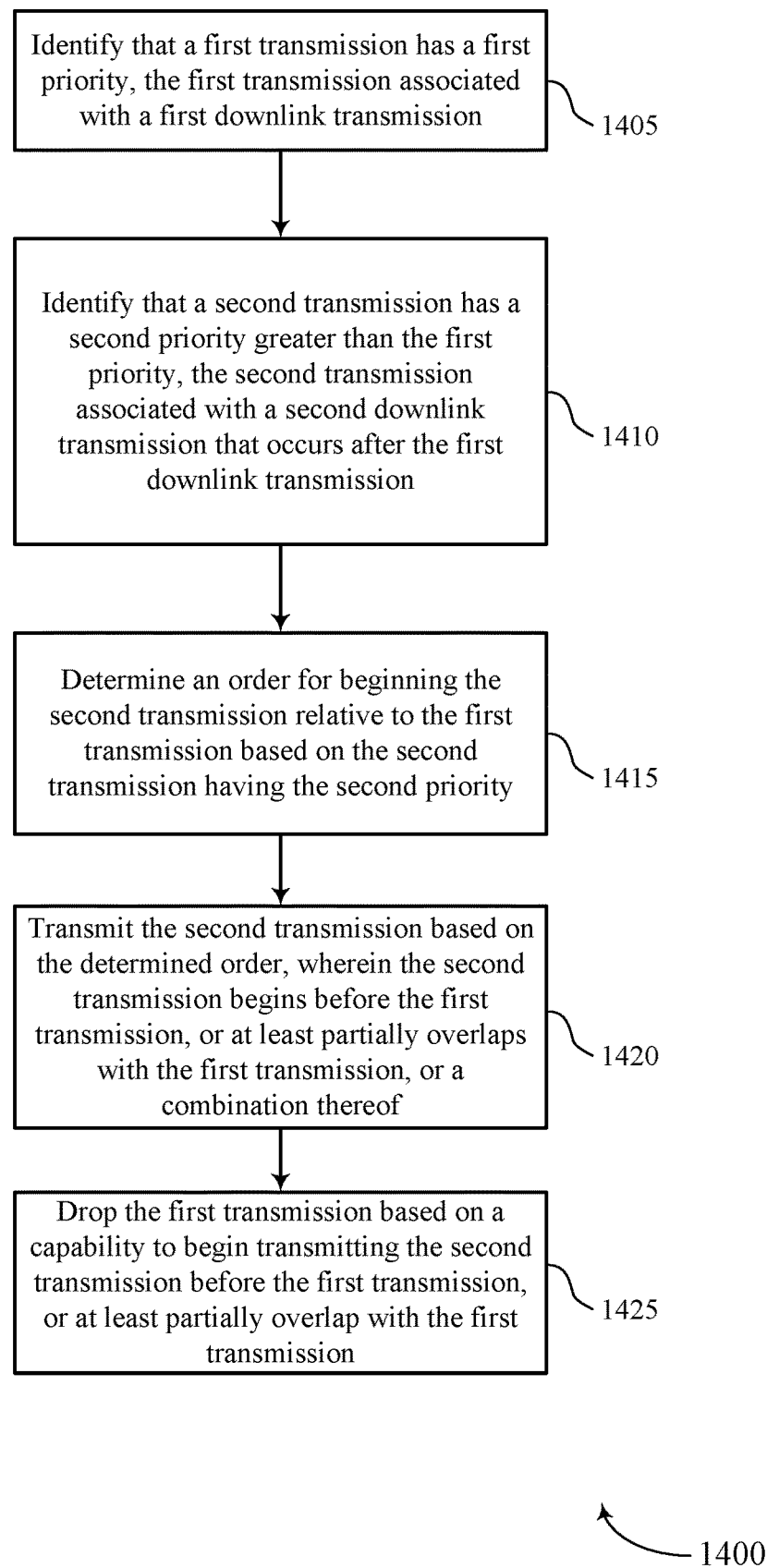

FIG. 14 shows a flowchart illustrating a method 1400 that supports out-of-order scheduling in accordance with aspects of the present disclosure. The operations of method 1400 may be implemented by a UE 115 or base station 105 or its components as described herein. For example, the operations of method 1400 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may identify that a first transmission has a first priority, the first transmission associated with a first downlink transmission. The operations of 1405 may be performed according to the methods described herein. In some examples, aspects of the operations of 1405 may be performed by a service manager as described with reference to FIGS. 6 through 10.

At 1410, the UE or base station may identify that a second transmission has a second priority greater than the first priority, the second transmission associated with a second downlink transmission that occurs after the first downlink transmission. The operations of 1410 may be performed according to the methods described herein. In some examples, aspects of the operations of 1410 may be performed by a service manager as described with reference to FIGS. 6 through 10.

At 1415, the UE or base station may determine a scheduling order for transmitting the second transmission before the first transmission based on the second transmission having the second priority. In some examples, the UE or base station may determine an order for beginning the second transmission relative to the first transmission based on the second transmission having the second priority. The operations of 1415 may be performed according to the methods described herein. In some examples, aspects of the operations of 1415 may be performed by a scheduling manager as described with reference to FIGS. 6 through 10.

At 1420, the UE or base station may transmit the second transmission before the first transmission based on the scheduling order. In some examples, UE or base station may transmit the second transmission based on the determined order, where the second transmission begins before the first transmission, or at least partially overlaps with the first transmission, or a combination thereof. The operations of 1420 may be performed according to the methods described herein. In some examples, aspects of the operations of 1420 may be performed by a transmission manager as described with reference to FIGS. 6 through 10.

At 1425, the UE or base station may drop the first transmission based on a capability to transmit the second transmission before the first transmission. The operations of 1425 may be performed according to the methods described herein. In some examples, aspects of the operations of 1425 may be performed by a transmission manager as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a User Equipment (UE), comprising:
   identifying, by the UE, that a first transmission has a first priority, the first transmission associated with a first downlink transmission received by the UE;
   identifying, by the UE, that a second transmission has a second priority greater than the first priority, the second transmission associated with a second downlink transmission received by the UE after the first downlink transmission was received by the UE, wherein resources of the first transmission are scheduled to be begin before resources of the second transmission;
   modifying, by the UE, an order for beginning the second transmission relative to the first transmission based at least in part on the second transmission having the second priority; and
   transmitting, by the UE, the second transmission based at least in part on the modified order, wherein the second transmission begins before the first transmission, at least partially overlaps with the first transmission, or a combination thereof.

2. The method of claim 1, further comprising:
   determining a first duration between the first downlink transmission and the first transmission and a second duration between the second downlink transmission and the second transmission that is less than the first duration; and
   determining that the second transmission is scheduled to begin before the first transmission, at least partially overlap with the first transmission, or a combination thereof based at least in part on the second duration being less than the first duration.

3. The method of claim 1, further comprising:
   identifying that a third transmission has the second priority, the third transmission associated with a third downlink transmission that occurs after the second downlink transmission; and
   determining a second order for beginning the third transmission relative to the first transmission based at least in part on the third transmission and the second transmission having a same priority.

4. The method of claim 3, further comprising:
   transmitting the second transmission based at least in part on the determined second order, wherein the third transmission begins before the first transmission, at least partially overlaps with the first transmission, or a combination thereof.

5. The method of claim 4, wherein the second transmission is transmitted before the third transmission.

6. The method of claim 3, further comprising:
   identifying that a fourth transmission has the second priority, the fourth transmission associated with a fourth downlink transmission that occurs after the third downlink transmission; receiving, via downlink control information (DCI), an indication that the beginning of the third transmission is scheduled after the beginning of the fourth transmission, at least partially overlaps with the fourth transmission, or a combination thereof;
   dropping the third transmission based at least in part on the indication; and
   transmitting the fourth transmission.

7. The method of claim 3, further comprising:
   identifying that a fourth transmission has the second priority, the fourth transmission associated with a fourth downlink transmission that occurs after the third downlink transmission;
   receiving, via downlink control information (DCI), an indication that the beginning of the third transmission is scheduled after the beginning of the fourth transmission, at least partially overlaps with the fourth transmission, or a combination thereof;
   dropping the fourth transmission based at least in part on the indication; and
   transmitting the third transmission.

8. The method of claim 3, further comprising:
   identifying that a fourth transmission has the second priority, the fourth transmission associated with a fourth downlink transmission that occurs after the third downlink transmission;
   receiving, via downlink control information (DCI), an indication that the beginning of the third transmission is scheduled after the beginning of the fourth transmission, at least partially overlaps with the fourth transmission, or a combination thereof and
   identifying a scheduling error based at least in part on the indication.

9. The method of claim 1, further comprising:
   dropping the first transmission based at least in part on a capability to begin transmitting the second transmission before the first transmission, at least partially overlap with the first transmission, or a combination thereof.

10. The method of claim 1, wherein:
transmitting the first transmission and the second transmission is based at least in part on the first transmission and the second transmission satisfying a communications constraint associated with the first priority, the second priority, or both; and
wherein the communications constraint comprises: a number of component carriers, a transport block size, a number of layers, a number of resource blocks (RBs), a number of symbol period for control information, a modulation and coding scheme (MCS), or a combination thereof.

11. The method of claim 1, wherein the second transmission comprises a hybrid automatic repeat request (HARQ) acknowledgment/negative acknowledgment (ACK/NACK) in response to the second downlink transmission, the second downlink transmission comprising a physical downlink shared channel (PDSCH).

12. The method of claim 1, wherein the second transmission comprises a physical uplink shared channel (PUSCH) based at least in part on a resource grant included in the second downlink transmission, the second downlink transmission comprising a physical downlink control channel (PDCCH).

13. The method of claim 1, wherein the second transmission comprises a physical downlink shared channel (PDSCH) based at least in part on a resource grant included in the second downlink transmission, the second downlink transmission comprising a physical downlink control channel (PDCCH).

14. The method of claim 1, wherein the first transmission includes a first service type.

15. The method of claim 1, wherein the second transmission includes a second service type that is associated with high-priority communications.

16. An apparatus for wireless communication, comprising:
a processor,
memory in electronic communication with the processor; and
instructions stored in the memory and executable by the processor to cause the apparatus to:
identify, at a User Equipment (UE), that a first transmission has a first priority, the first transmission associated with a first downlink transmission received by the UE;
identify, at the UE, that a second transmission has a second priority greater than the first priority, the second transmission associated with a second downlink transmission received by the UE after the first downlink transmission was received by the UE, wherein resources of the first transmission are scheduled to begin before resources of the second transmission;
modify, at the UE, an order for beginning the second transmission relative to the first transmission based at least in part on the second transmission having the second priority; and
transmit, at the UE, the second transmission based at least in part on the modified order, wherein the second transmission begins before the first transmission, at least partially overlaps with the first transmission, or a combination thereof.

17. The apparatus of claim 16, wherein the instructions are further executable by the processor to cause the apparatus to:
determine a first duration between the first downlink transmission and the first transmission and a second duration between the second downlink transmission and the second transmission that is less than the first duration; and
determine that the second transmission is scheduled to begin before the first transmission, at least partially overlap with the first transmission, or a combination thereof based at least in part on the second duration being less than the first duration.

18. The apparatus of claim 16, wherein the instructions are further executable by the processor to cause the apparatus to:
identify that a third transmission has the second priority, the third transmission associated with a third downlink transmission that occurs after the second downlink transmission; and
determine a second order for beginning the third transmission relative to the first transmission based at least in part on the third transmission having the second priority and the second transmission having the second priority.

19. The apparatus of claim 18, wherein the instructions are further executable by the processor to cause the apparatus to:
transmit the second transmission based at least in part on the determined order, wherein the third transmission begins before the first transmission, at least partially overlaps with the first transmission, or a combination thereof.

20. The apparatus of claim 19, wherein the second transmission is transmitted before the third transmission.

21. The apparatus of claim 18, wherein the instructions are further executable by the processor to cause the apparatus to:
identify that a fourth transmission has the second priority, the fourth transmission associated with a fourth downlink transmission that occurs after the third downlink transmission;
receive, via downlink control information (DCI), an indication that the beginning of the third transmission is scheduled after the beginning of the fourth transmission, at least partially overlaps with the fourth transmission, or a combination thereof;
drop the third transmission based at least in part on the indication; and
transmit the fourth transmission.

22. The apparatus of claim 18, wherein the instructions are further executable by the processor to cause the apparatus to:
identify that a fourth transmission has the second priority, the fourth transmission associated with a fourth downlink transmission that occurs after the third downlink transmission;
receive, via downlink control information (DCI), an indication that the beginning of the third transmission is scheduled after the beginning of the fourth transmission, at least partially overlaps with the fourth transmission, or a combination thereof;
drop the fourth transmission based at least in part on the indication; and
transmit the third transmission.

23. The apparatus of claim 18, wherein the instructions are further executable by the processor to cause the apparatus to:

identify that a fourth transmission has the second priority, the fourth transmission associated with a fourth downlink transmission that occurs after the third downlink transmission;

receive, via downlink control information (DCI), an indication that the beginning of the third transmission is scheduled after the beginning of the fourth transmission, at least partially overlaps with the fourth transmission, or a combination thereof; and identify a scheduling error based at least in part on the indication.

24. The apparatus of claim 16, wherein the instructions are further executable by the processor to cause the apparatus to:

drop the first transmission based at least in part on a capability to begin transmitting the second transmission before the first transmission, at least partially overlap with the first transmission.

25. The apparatus of claim 16, wherein:

transmit the first transmission and the second transmission is based at least in part on the first transmission and the second transmission satisfying a communications constraint associated with the first priority, the second priority, or both; and wherein the communications constraint comprises: a number of component carriers, a transport block size, a number of layers, a number of resource blocks (RBs), a number of symbol period for control information, a modulation and coding scheme (MCS), or a combination thereof.

26. The apparatus of claim 16, wherein the second transmission comprises a hybrid automatic repeat request (HARQ) acknowledgment/negative acknowledgment (ACK/NACK) in response to the second downlink transmission, the second downlink transmission comprising a physical downlink shared channel (PDSCH).

27. The apparatus of claim 16, wherein the second transmission comprises a physical uplink shared channel (PUSCH) based at least in part on a resource grant included in the second downlink transmission, the second downlink transmission comprising a physical downlink control channel (PDCCH).

28. The apparatus of claim 16, wherein the second transmission comprises a physical downlink shared channel (PDSCH) based at least in part on a resource grant included in the second downlink transmission, the second downlink transmission comprising a physical downlink control channel (PDCCH).

29. The apparatus of claim 16, wherein the first transmission includes a first service type.

30. The apparatus of claim 16, wherein the second transmission includes a second service type that is associated with high-priority communications.

31. An apparatus for wireless communication, comprising:

means for identifying, at a User Equipment (UE), that a first transmission has a first priority, the first transmission associated with a first downlink transmission;

means for identifying, at the UE, that a second transmission has a second priority greater than the first priority, the second transmission associated with a second downlink transmission that occurs after the first downlink transmission, wherein resources of the first transmission are scheduled to begin before resources of the second transmission;

means for modifying, at the UE, an order for beginning the second transmission relative to the first transmission based at least in part on the second transmission having the second priority; and means for transmitting, at the UE, the second transmission based at least in part on the modified order, wherein the second transmission begins before the first transmission, at least partially overlaps with the first transmission, or a combination thereof.

32. The apparatus of claim 31, further comprising:

means for determining a first duration between the first downlink transmission and the first transmission and a second duration between the second downlink transmission and the second transmission that is less than the first duration; and means for determining that the second transmission is scheduled to begin before the first transmission, at least partially overlap with the first transmission, or a combination thereof based at least in part on the second duration being less than the first duration.

33. The apparatus of claim 31, further comprising:

means for identifying that a third transmission has the second priority, the third transmission associated with a third downlink transmission that occurs after the second downlink transmission; and means for determining a second order for beginning the third transmission relative to the first transmission based at least in part on the third transmission having the second priority and the second transmission having the second priority.

34. The apparatus of claim 33, further comprising:

means for transmitting the second transmission based at least in part on the determined order, wherein the third transmission begins before the first transmission, at least partially overlaps with the first transmission, or a combination thereof.

35. The apparatus of claim 34, wherein the second transmission is transmitted before the third transmission.

36. The apparatus of claim 33, further comprising:

means for identifying that a fourth transmission has the second priority, the fourth transmission associated with a fourth downlink transmission that occurs after the third downlink transmission;

means for receiving, via downlink control information (DCI), an indication that the beginning of the third transmission is scheduled after the beginning of the fourth transmission, at least partially overlaps with the fourth transmission, or a combination thereof means for dropping the third transmission based at least in part on the indication; and means for transmitting the fourth transmission.

37. The apparatus of claim 33, further comprising:

means for identifying that a fourth transmission has the second priority, the fourth transmission associated with a fourth downlink transmission that occurs after the third downlink transmission;

means for receiving, via downlink control information (DCI), an indication that the beginning of the third transmission is scheduled after the beginning of the fourth transmission, at least partially overlaps with the fourth transmission, or a combination thereof means for dropping the fourth transmission based at least in part on the indication; and means for transmitting the third transmission.

38. The apparatus of claim 33, further comprising:
means for identifying that a fourth transmission has the second priority, the fourth transmission associated with a fourth downlink transmission that occurs after the third downlink transmission;
means for receiving, via downlink control information (DCI), an indication that the beginning of the third transmission is scheduled after the beginning of the fourth transmission, at least partially overlaps with the fourth transmission, or a combination thereof and
means for identifying a scheduling error based at least in part on the indication.

39. The apparatus of claim 31, further comprising:
means for dropping the first transmission based at least in part on a capability to begin transmitting the second transmission before the first transmission, at least partially overlap with the first transmission.

40. The apparatus of claim 31, wherein:
means for transmitting the first transmission and the second transmission is based at least in part on the first transmission and the second transmission satisfying a communications constraint associated with the first priority, the second priority, or both; and
wherein the communications constraint comprises: a number of component carriers, a transport block size, a number of layers, a number of resource blocks (RBs), a number of symbol period for control information, a modulation and coding scheme (MCS), or a combination thereof.

41. The apparatus for claim 31, wherein the second transmission comprises a hybrid automatic repeat request (HARQ) acknowledgment/negative acknowledgment (ACK/NACK) in response to the second downlink transmission, the second downlink transmission comprising a physical downlink shared channel (PDSCH).

42. The apparatus of claim 31, wherein the second transmission comprises a physical uplink shared channel (PUSCH) based at least in part on a resource grant included in the second downlink transmission, the second downlink transmission comprising a physical downlink control channel (PDCCH).

43. The apparatus of claim 31, wherein the second transmission comprises a physical downlink shared channel (PDSCH) based at least in part on a resource grant included in the second downlink transmission, the second downlink transmission comprising a physical downlink control channel (PDCCH).

44. The apparatus of claim 31, wherein the first transmission includes a first service type.

45. The apparatus of claim 31, wherein the second transmission includes a second service type that is associated with high-priority communications.

46. A non-transitory computer-readable medium storing code for wireless communication, the code comprising instructions executable by a processor to:
identify, at a User Equipment (UE), that a first transmission has a first priority, the first transmission associated with a first downlink transmission;
identify, at the UE, that a second transmission has a second priority greater than the first priority, the second transmission associated with a second downlink transmission that occurs after the first downlink transmission, wherein resources of the first transmission are scheduled to be begin before resources of the second transmission;
modify, at the UE, an order for beginning the second transmission relative to the first transmission based at least in part on the second transmission having the second priority; and
transmit, at the UE, the second transmission based at least in part on the modified order, wherein the second transmission begins before the first transmission, at least partially overlaps with the first transmission, or a combination thereof.

47. The non-transitory computer-readable medium of claim 46, wherein the instructions are further executable to:
determine a first duration between the first downlink transmission and the first transmission and a second duration between the second downlink transmission and the second transmission that is less than the first duration; and
determine that the second transmission is scheduled to begin before the first transmission, at least partially overlap with the first transmission, or a combination thereof based at least in
part on the second duration being less than the first duration.

48. The non-transitory computer-readable medium of claim 46, wherein the instructions are further executable to:
identify that a third transmission has the second priority, the third transmission associated with a third downlink transmission that occurs after the second downlink transmission; and
determine a second order for beginning the third transmission relative to the first transmission based at least in part on the third transmission having the second priority and the second transmission having the second priority.

49. The non-transitory computer-readable medium of claim 48, wherein the instructions are further executable to:
transmit the second transmission based at least in part on the determined order, wherein the third transmission begins before the first transmission, at least partially overlaps with the first transmission, or a combination thereof.

50. The non-transitory computer-readable medium of claim 47, wherein the second transmission is transmitted before the third transmission.

51. The non-transitory computer-readable medium of claim 48, wherein the instructions are further executable to:
identify that a fourth transmission has the second priority, the fourth transmission associated with a fourth downlink transmission that occurs after the third downlink transmission;
receive, via downlink control information (DCI), an indication that the beginning of the third transmission is scheduled after the beginning of the fourth transmission, at least partially overlaps with the fourth transmission, or a combination thereof;
drop the third transmission based at least in part on the indication; and
transmit the fourth transmission.

52. The non-transitory computer-readable medium of claim 48, wherein the instructions are further executable to:
identify that a fourth transmission has the first priority, the fourth transmission associated with a fourth downlink transmission that occurs after the third downlink transmission;
receive, via downlink control information (DCI), an indication that the beginning of the third transmission is scheduled after the beginning of the fourth transmission, at least partially overlaps with the fourth transmission, or a combination thereof;

drop the fourth transmission based at least in part on the indication; and transmit the third transmission.

53. The non-transitory computer-readable medium of claim 48, wherein the instructions are further executable to:

identify that a fourth transmission has the second priority, the fourth transmission associated with a fourth downlink transmission that occurs after the third downlink transmission;

receive, via downlink control information (DCI), an indication that the beginning of the third transmission is scheduled after the beginning of the fourth transmission, at least partially overlaps with the fourth transmission, or a combination thereof; and identify a scheduling error based at least in part on the indication.

54. The non-transitory computer-readable medium of claim 46 wherein the instructions are further executable to:

drop the first transmission based at least in part on a capability to begin transmitting the second transmission before the first transmission, at least partially overlap with the first transmission.

55. The non-transitory computer-readable medium of claim 46, wherein:

transmit the first transmission and the second transmission is based at least in part on the first transmission and the second transmission satisfying a communications constraint associated with the first priority, the second priority, or both; and wherein the communications constraint comprises: a number of component carriers, a transport block size, a number of layers, a number of resource blocks (RBs), a number of symbol period for control information, a modulation and coding scheme (MCS), or a combination thereof.

56. The non-transitory computer-readable medium of claim 46, wherein the second transmission comprises a hybrid automatic repeat request (HARQ) acknowledgment/negative acknowledgment (ACK/NACK) in response to the second downlink transmission, the second downlink transmission comprising a physical downlink shared channel (PDSCH).

57. The non-transitory computer-readable medium of claim 46, wherein the second transmission comprises a physical uplink shared channel (PUSCH) based at least in part on a resource grant included in the second downlink transmission, the second downlink transmission comprising a physical downlink control channel (PDCCH).

58. The non-transitory computer-readable medium of claim 46, wherein the second transmission comprises a physical downlink shared channel (PDSCH) based at least in part on a resource grant included in the second downlink transmission, the second downlink transmission comprising a physical downlink control channel (PDCCH).

* * * * *